(12) United States Patent
Tonchia et al.

(10) Patent No.: US 9,568,630 B2
(45) Date of Patent: Feb. 14, 2017

(54) DEVICE AND METHOD FOR STEERING SEISMIC VESSEL

(71) Applicant: CGG SERVICES SA, Massy (FR)

(72) Inventors: Hélène Tonchia, Antony (FR); Timothée Moulinier, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/438,343

(22) PCT Filed: Nov. 18, 2014

(86) PCT No.: PCT/EP2014/074891
§ 371 (c)(1),
(2) Date: Apr. 24, 2015

(87) PCT Pub. No.: WO2015/071491
PCT Pub. Date: May 21, 2015

(65) Prior Publication Data
US 2016/0061980 A1    Mar. 3, 2016

Related U.S. Application Data

(60) Provisional application No. 61/905,369, filed on Nov. 18, 2013.

(51) Int. Cl.
*B60L 3/00* (2006.01)
*G01V 1/38* (2006.01)
*B63H 25/04* (2006.01)

(52) U.S. Cl.
CPC ............. *G01V 1/3808* (2013.01); *B63H 25/04* (2013.01); *B63H 2025/045* (2013.01); *G01V 2210/16* (2013.01)

(58) Field of Classification Search
USPC .............................................. 701/21; 367/16
See application file for complete search history.

(56) References Cited

U.S. PATENT DOCUMENTS

| 7,415,936 B2 | 8/2008 | Storteig et al. |
| 7,804,738 B2 | 9/2010 | Storteig et al. |
| (Continued) | | |

FOREIGN PATENT DOCUMENTS

| EP | 1735641 A0 | 10/2005 |
| EP | 2280294 A2 | 2/2011 |
| (Continued) | | |

OTHER PUBLICATIONS

G. Brown et al., "Improved Marine 4D Repeatability Using an Automated Vessel, Source and Receiver Positioning System", First Break, Nov. 2011, pp. 49-58, vol. 29.

(Continued)

*Primary Examiner* — Tyler Paige
(74) *Attorney, Agent, or Firm* — Patent Portfolio Builders PLLC

(57) ABSTRACT

System and method for steering a vessel during a marine acquisition campaign. The method includes obtaining a pre-plot track of a steered point, wherein the steered point is associated with an equipment spread towed by the vessel; calculating an offset between a past position of the vessel and a current position of the steered point; and steering the vessel along a vessel track, wherein the vessel track is calculated by shifting the pre-plot track of the steered point with at least a cross-line component of the offset.

20 Claims, 23 Drawing Sheets

(56) References Cited

U.S. PATENT DOCUMENTS

| | | | |
|---|---|---|---|
| 8,175,765 B2 | 5/2012 | Holo et al. | |
| 8,391,102 B2 | 3/2013 | Holo | |
| 8,473,175 B2 | 6/2013 | Holo et al. | |
| 8,570,830 B2 | 10/2013 | Storteig et al. | |
| 8,717,845 B2 | 5/2014 | Boberg et al. | |
| 8,760,964 B2 | 6/2014 | Moldoveanu et al. | |
| 8,792,297 B2 | 7/2014 | Hillesund et al. | |
| 8,824,239 B2 | 9/2014 | Welker et al. | |
| 2007/0223306 A1* | 9/2007 | Toennessen | G01V 1/3808 367/15 |
| 2008/0175097 A1* | 7/2008 | Storteig | B63B 21/66 367/16 |
| 2011/0286302 A1* | 11/2011 | Welker | G01V 1/3826 367/16 |
| 2011/0305106 A1* | 12/2011 | Eick | G01V 1/3826 367/17 |
| 2012/0002503 A1* | 1/2012 | Janiszewski | G01V 1/3808 367/20 |
| 2012/0113745 A1* | 5/2012 | Eick | G01V 1/3817 367/16 |
| 2012/0239232 A1 | 9/2012 | Solheim | |
| 2013/0051175 A1* | 2/2013 | Boberg | G01V 1/3817 367/16 |
| 2013/0070557 A1 | 3/2013 | Tonchia et al. | |
| 2013/0155805 A1 | 6/2013 | Tonchia | |
| 2014/0029379 A1 | 1/2014 | Roger et al. | |
| 2014/0121977 A1* | 5/2014 | Lecocq | G01V 1/38 702/11 |
| 2015/0016218 A1 | 1/2015 | Welker et al. | |

FOREIGN PATENT DOCUMENTS

| | | | |
|---|---|---|---|
| EP | 2280294 A3 | 1/2012 |
| EP | 2402791 A2 | 1/2012 |
| EP | 2402791 A3 | 4/2013 |
| EP | 2605048 A1 | 6/2013 |
| GB | 2400662 A | 10/2004 |
| WO | 2005/096018 A1 | 10/2005 |
| WO | 2010/005673 A2 | 1/2010 |

OTHER PUBLICATIONS

International Search Report and Written Opinion of the International Searching Authority in related International Application No. PCT/EP2014/074891, mailed Apr. 7, 2015.

Office Action in corresponding European Application No. 14 799 476.8 dated Dec. 4, 2015.

Office Action in corresponding European Application No. 14 799 476.8 dated Aug. 26, 2016.

Office Action in corresponding Australian Application No. 12014350068 dated May 21, 2016.

* cited by examiner

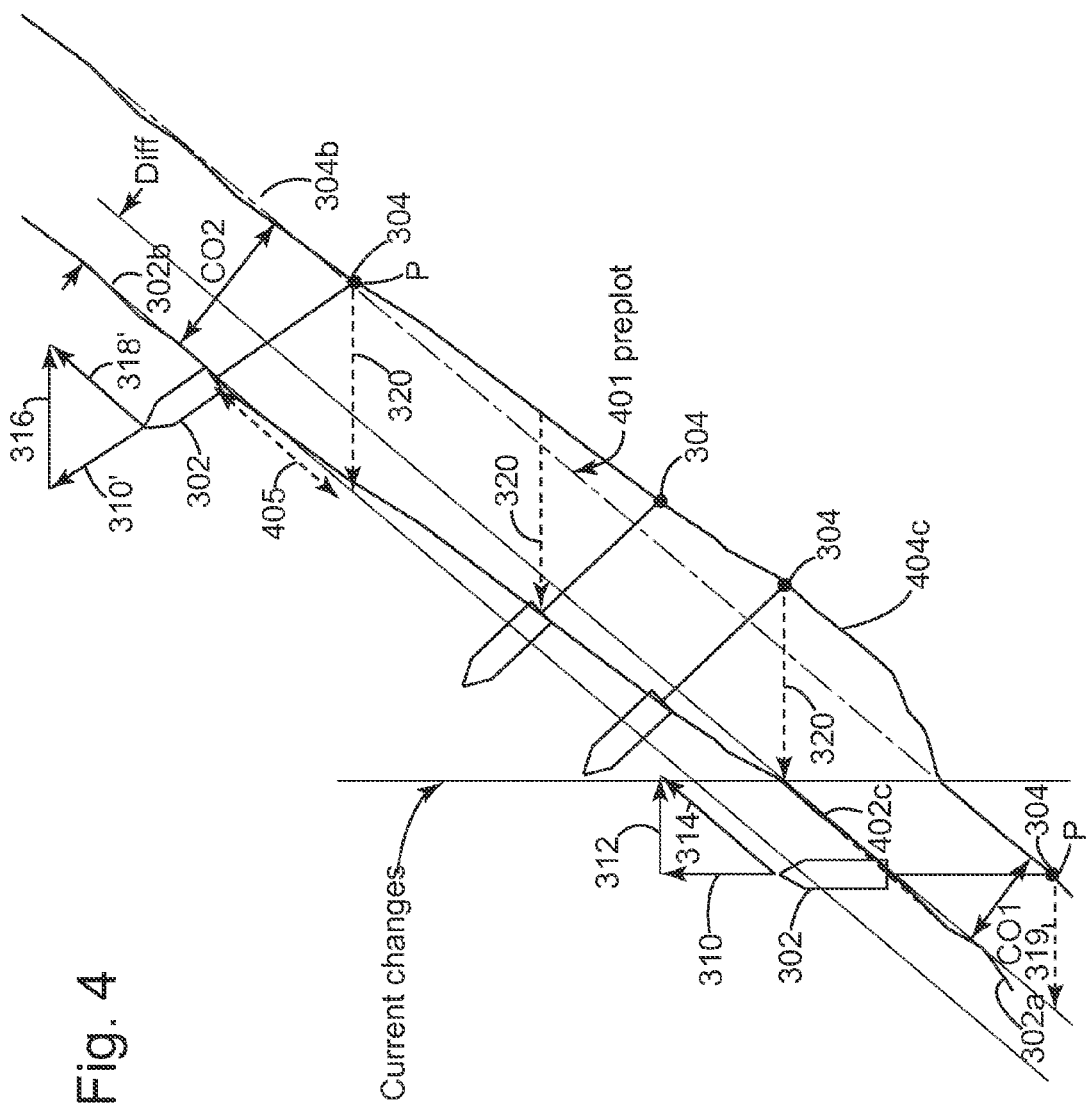

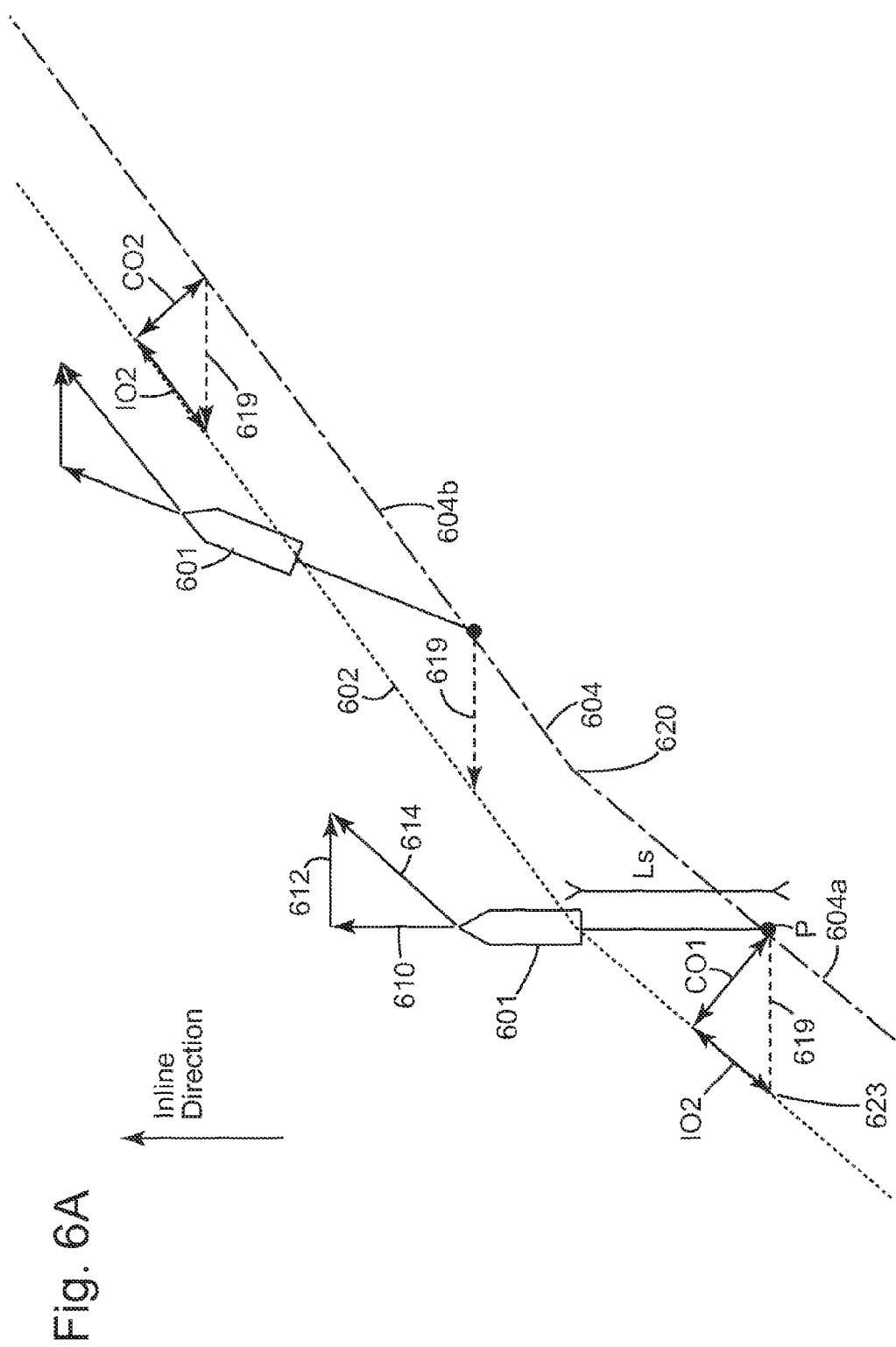

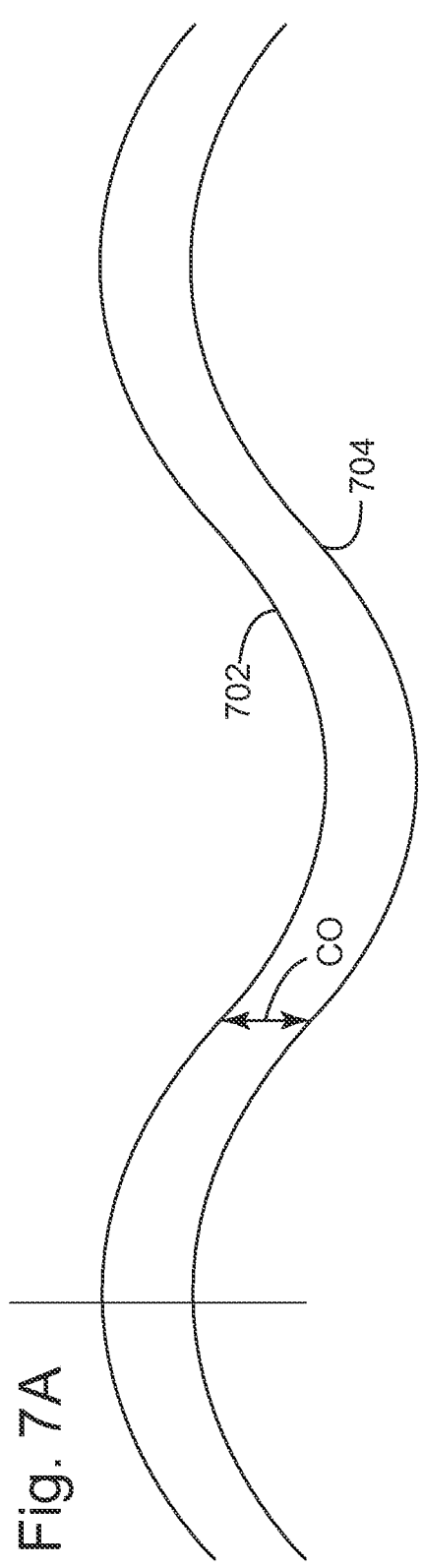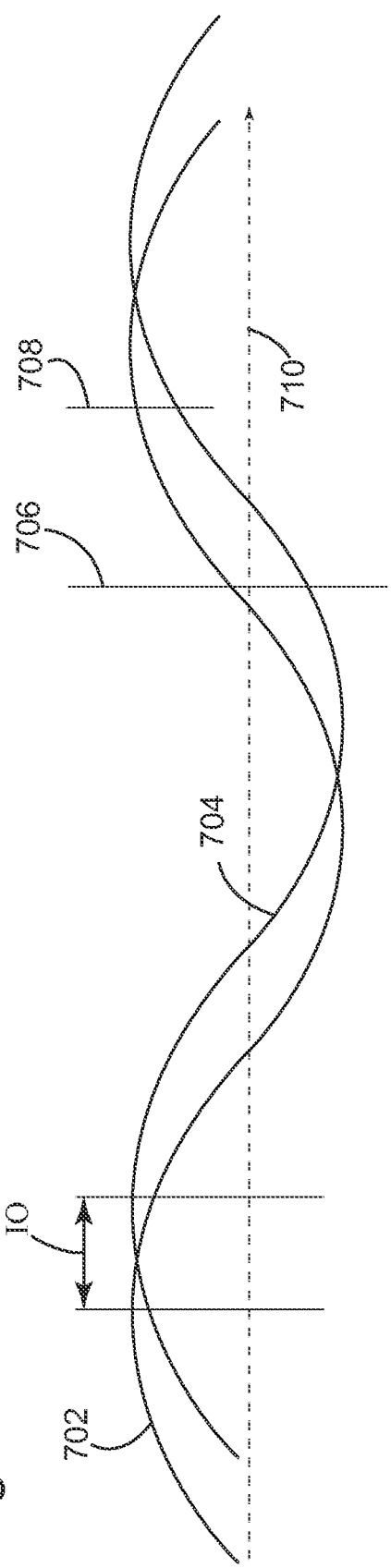
Fig. 7A
Fig. 7B

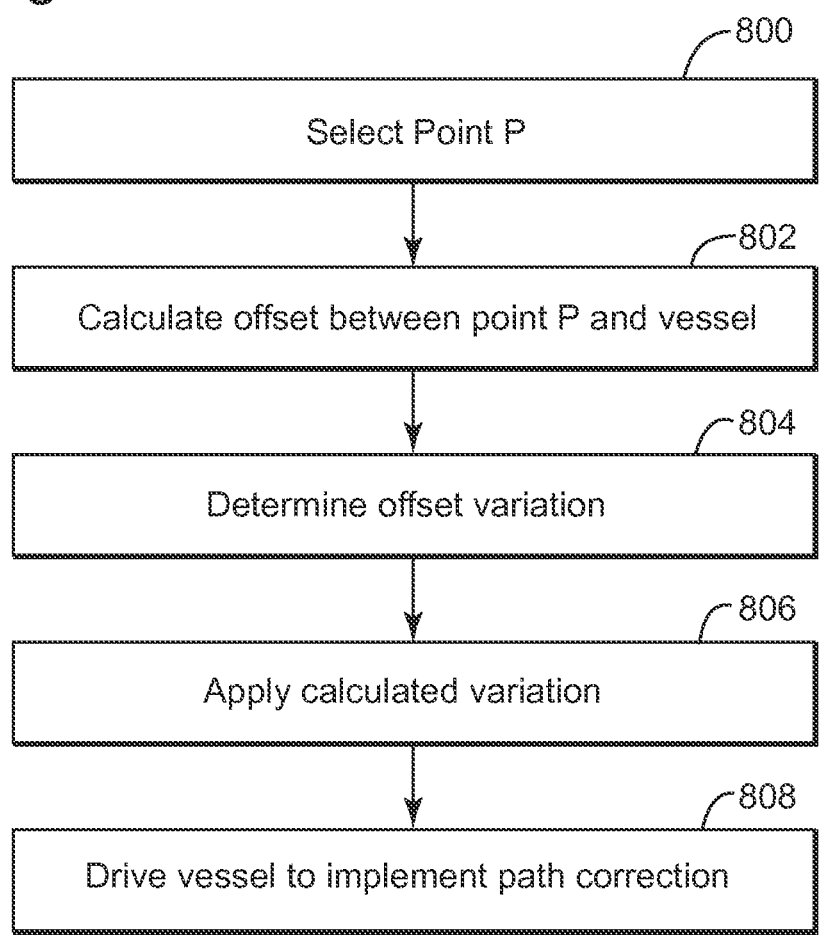

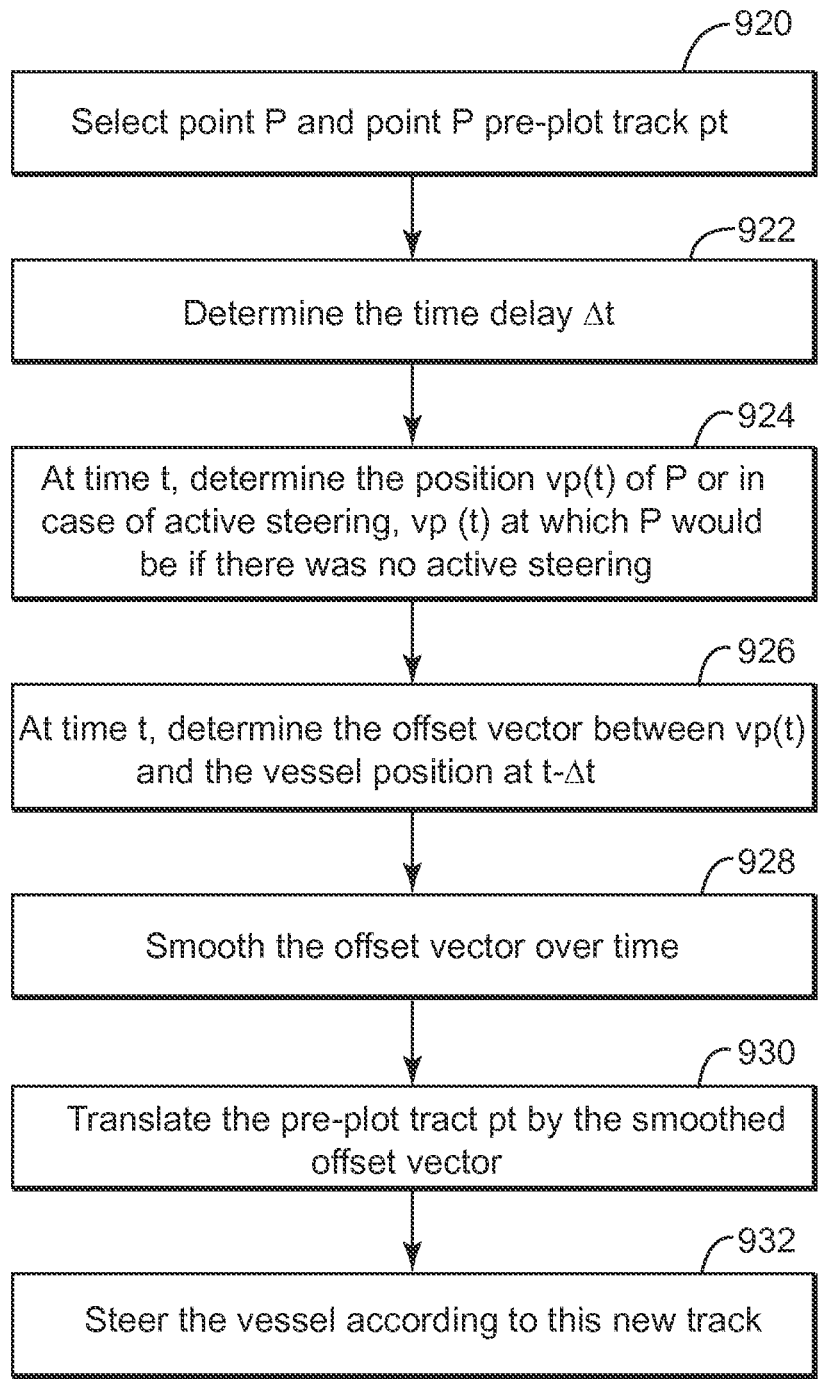

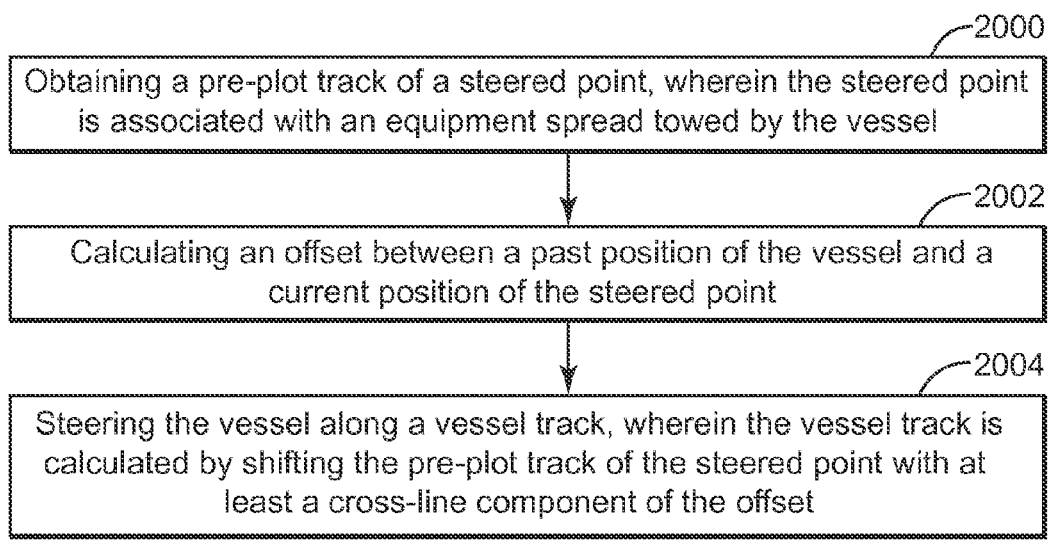

DEVICE AND METHOD FOR STEERING SEISMIC VESSEL

CROSS-REFERENCE TO RELATED APPLICATIONS

This application is the National Stage of International Application No. PCT/EP2014/074891 filed on Nov. 18, 2014, which claims priority and benefit from U.S. Provisional Patent Application Ser. No. 61/905,369, filed Nov. 18, 2013, for "Line Steering", the entire contents of which are expressly incorporated herein by reference.

BACKGROUND

Technical Field

Embodiments of the subject matter disclosed herein generally relate to methods and systems and, more particularly, to mechanisms and techniques for steering a seismic vessel that tows marine equipment so that the marine equipment follows a pre-determined track.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration employed to determine the image of earth's subsurface. Marine reflection seismology is based on using a controlled source of energy that sends energy into the earth. By measuring the time it takes for reflections to return to plural receivers, it is possible to evaluate the depth of features causing such reflections. These features may be associated with subterranean hydrocarbon deposits.

A traditional system 100 for generating seismic waves and recording their reflections off geological structures present in the subsurface is illustrated in FIG. 1A. A vessel 101 tows an array of seismic receivers 102 provided on streamers 103, which may be disposed to have a variable-depth, i.e., make an angle with ocean's surface 104. The streamers may be disposed to have other spatial arrangements, i.e., horizontal. Vessel 101 also tows a seismic source array 106 configured to generate a seismic wave 108. Seismic source array 106 may include plural individual source elements 107. The individual source elements may be distributed in various patterns, e.g., circular, linear, at various depths in the water.

Seismic wave 108 propagates downward toward the seafloor 120 and penetrates the seafloor until eventually a reflecting structure 122 (reflector) reflects the seismic wave. The reflected seismic wave 124 propagates upward until it is detected by receiver 102 on streamer 103. Based on the data collected by receivers 102, an image of the subsurface is generated.

For some planned seismic surveys, the source array and streamers should follow globally pre-determined tracks (or pre-plot or pre-plot track) so that the entire subsurface of interest is surveyed. The term "track" is understood herein to include the intended or desired horizontal direction of travel with respect to the earth. The term "course" is different from the term "track" as it includes the intended or desired horizontal direction of travel with respect to the water. For completeness, the term "heading" means a horizontal direction in which the vessel actually points or heads at any instant, the term "track over the ground" means the path over the ground actually followed by the vessel, and the term "track made good" is the single resultant direction from a point of departure to a point of arrival at any given time. The term "path over the ground" may also be understood to include actual previous positions of a traveling point (e.g., a source array) relative to Earth, as recorded for example by a GPS on the source array. All these concepts are illustrated in FIG. 1B.

There are different strategies to acquire the relevant seismic data related to the area of interest. For exploration surveys, the equipment (i.e., source array and/or streamer spread) is usually steered for coverage to achieve a given number of seismic traces per bin (a definition for a bin is provided, for example, in U.S. Patent Publication No. 2014/0029379, the entire content of which is included herein by reference). For multi-vessel, wide azimuth surveys, the vessels usually follow pre-determined tracks instead of steering for coverage. On circular or "coil" shooting surveys, the vessels usually follow pre-determined tracks instead of steering for coverage. This would also be the case for more complex patterns (sinusoidal or curved for example) or even for shooting during the "line change." With OBS (Ocean Bottom Seismic), cables and/or nodes laid on the seafloor, the vessels usually follow pre-determined track as steering for coverage is meaningless. For "monitoring" surveys but also on baseline survey, it is the repeatability of the seismic equipment positions that is at stake and therefore, the equipment is steered for position in order to match a previous survey (base survey) or in order to have a baseline survey easy to match. It has been proven that 4-dimensional (4D) noise is correlated with mis-positioning of the source and/or streamers. The pre-determined tracks for seismic equipment, typically the acoustic sources, are usually achieved by a combination of a manual vessel steering system and sometimes a source steering system. Usually, the vessel is automatically steered by an auto-pilot system or PID controller 10 (Robtrack or Kongsberg Cjoy PID systems are the most commonly used in seismic acquisition) so as to be at a given cross-line distance from the seismic equipment's "given track." For example, for a single source vessel, the given track would be the pre-determined track or pre-plot that the center of source should be following. In some cases, the pre-plot line could be just a straight line. Thus, the source vessel's auto-pilot is supposed to follow the given track with a certain cross-line distance. The seismic navigation system compares the vessel position with the "given track" and sends information to the autopilot so that the vessel follows the "given track at a certain cross-line distance." At the same time, the navigator is following the deviation between the equipment positions, typically the sources mid-point, and the previous survey's equipment position, typically the sources mid-point track, but it could be any other point real or not. Based on that difference, the operator determines the cross-line distance at which the vessel should follow the given track. This cross-line distance is relayed to the autopilot by the seismic navigation system. The navigation system does not steer the vessel, but informs the autopilot on where the vessel should be and where it is currently relative to where it should be. The navigator is using the comparison of the current equipment position with the previous equipment position (from the base survey) for this purpose.

However, the manual determination of the best cross-line distance at which to steer the vessel is a real challenge for the navigator. There are several main issues in the way it is currently implemented in the main navigation system, and in the way a navigator can manage it. For example, there is a delay between the setting of a new cross-line distance and when the autopilot system reaches its target. Depending on the setting of the PID controller in the autopilot, the vessel may overshoot its target before coming back. The operator should be able to overlook those effects. However, there is an even longer delay in between the time when the vessel reaches its new target and when the position of the equipment is affected by the modification. A very skilled navigator is able to process all this data to determine a good cross-line distance due to a change of current, for example, taking into account the change to come due to its previous settings and overlooking any overshot of the vessel steering. Usually, manual interaction can induce oscillations of the equipment due to the delays in the corrections. Once the navigator is aware that the source/receiver spread is moving away from the desired track, it is too late to avoid significant mis-positioning. Subsequent corrections via alterations of the vessel's heading are likely to lead to over-corrections and an oscillatory path over the ground of vessel and source/receiver spread about the required track. Small deviations may not be reacted upon which might lead to too slow reactions when the ocean current condition changes. The steering performance will also depend on the navigator's skill level and level of alertness.

In U.S. Pat. No. 8,391,102 (the '102 patent herein), a method is described about how to automate both the steering of the vessel and the determination of the new track to be followed by a tracking point (having steering capability) based on the difference between the tracking point on the seismic spread and the pre-determined track and for the vessel steering using the difference between the new track and the measured track (of the tracking point in the spread). Various inputs can be considered by the controller or the navigator, e.g., environmental current and winds.

According to this method, as in most or all the methods for 4D vessel steering, the pre-determined position of a point in the spread is compared to its measured position to control the vessel steering. As the objective of the survey is to get a point in the spread to follow a pre-determined track, comparing its measured position to the intended one and computing a residual (difference) may seem to be the obvious way to do it. However, the inventors have discovered that this is not very efficient. The residual is very noisy and is not the important parameter. One of the issues encountered by the method of the '102 patent is that the vessel may not follow a straight line, but it may present long period oscillations around a straight line, depending on the parameters of the autopilot's PID controller. These oscillations will be reflected, after a given time delay, by the seismic spread and they will appear as residual in the current methods and will trigger correcting commands on the vessel steering. In the example described here, there should not be any correcting command send to the vessel steering, so it will create even more oscillations. This issue is encountered with all traditional systems that compare the current position of the spread with an intended track, whether it is manual or automated. Experience shows that the autopilot parameters need to be adapted to the weather conditions and to the way the vessel reacts, which is based on the speed, the size of the spreads and the deflectors. Thus, those skilled in the art would appreciate that, from one area to the other and from one spread to the other and depending on the weather conditions, the autopilot PID parameters may not be always optimally tuned. It is why a novel steering method that is stable in those cases is needed.

Another issue faced by the vessel steering control system, both with automated version and manual version, is the delay between the change of position of the vessel and the change of position induced in the spread. When the navigator or the controller orders the vessel to move cross-line by a certain distance, it is difficult for the system or the navigator to determine if the change in the residual between the intended track of the spread and its current position is due to the command sent to the vessel or due to a new change in external conditions, for example, current.

Because it is difficult for the current systems to distinguish the effects of wind and currents versus the effect of the steering, they need to add as input current and wind measurements. Those measurements may have errors and by adding those, the complexity of the system increases, which affects its robustness and accuracy.

European Patent EP 1735 641B discloses a way to improve the stability issue due to the reaction delay noted above. According to this document, instead of requesting the vessel to move to a given cross-line distance relative to the predefined track, which will change the position of the spread element with a delay or response time, it computes, using a complex force model, optimum tracks to be followed by the source and receivers. As long as the trajectory of the source and receivers stays within a "no change" corridor, no commands are sent to the vessel, which improves the system's stability. However, the force model is quite complex and requires good environmental data and good calibration.

In one embodiment of EP 1735641B, to overcome the stability issues, the response times of some spread element are estimated and taken into account, particularly when drive commands are sent to the vessel. However, determining the response times of the system elements to issue targets to the vessel autopilot, which removes some possible errors, is a complex task that is undesirable for the system's operator.

The above-noted problems are exacerbated for four-dimensional (4D) geophysical imaging, which is becoming more desired today. For 4D geophysical imaging, accurately positioning the source array and/or the streamers is important. 4D geophysical imagining involves 3D seismic surveys repeated over a same subsurface at different moments in time to determine changes in subsurface geophysical structures. Thus, as the 3D survey is repeated in time, sometimes after a few months or years, it is desirable that sources being used to generate seismic waves be located as close as possible to the positions used in the previous survey over the subsurface. It has been proven that the best way to compare surveys is to have traces which are repeated as accurately as possible. The trace is based on the source position and the receiver position.

Thus, it is challenging with existing methods to position various source arrays and/or streamers, at different moments in time, at the same locations, given cross-currents, wind, waves, shallow water and navigation obstacles currently encountered by vessels performing seismic surveys.

Accordingly, it would be desirable to provide systems and methods that provide a simpler method for controlling a vessel's trajectory so that towed marine equipment, e.g., source array or streamers, is more accurately positioned at desired locations during seismic surveys.

SUMMARY

According to one embodiment, there is a method for steering a vessel during a marine acquisition campaign. The method includes obtaining a pre-plot track of a steered point, wherein the steered point is associated with an equipment spread towed by the vessel; calculating an offset between a past position of the vessel and a current position of the steered point; and steering the vessel along a vessel track, wherein the vessel track is calculated by shifting the pre-plot track of the steered point with at least a cross-line component of the offset.

According to another embodiment, there is a method for steering a vessel during a marine seismic acquisition campaign. The method includes a step of determining a variation ($\delta$) of a cross-line component (CO) of an offset between a past position of a vessel and a current position of a steered point (P) associated with a marine seismic spread towed by the vessel during the campaign and a step of offsetting a current track of the vessel with the variation ($\delta$) when the variation ($\delta$) is larger than a given threshold.

According to yet another embodiment, there is a navigation system configured to steer a vessel and associated seismic equipment. The system includes a global positioning system configured to generate a first position for the vessel and a second position for the associated seismic equipment; and a navigation module that obtains a pre-plot track of a steered point, wherein the steered point is associated with the associated seismic equipment towed by the vessel, calculates an offset between a past position of the vessel and a current position of the steered point, and steers the vessel along a vessel track, wherein the vessel track is calculated by shifting the pre-plot track of the steered point with at least a cross-line component of the offset.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 illustrates a streamer vessel's pre-determined track and a steered point's track when there is a current change;

FIG. 6A illustrates using a vector offset for determining the vessel's track relative to a steered point's track;

FIGS. 7A-D illustrate the effect of inline and crossline offset on the steered point's and vessel's tracks;

FIG. 8 is a flowchart of a method for steering the vessel based on the offset variation between the vessel and the steered point;

FIG. 9B is a flowchart of a method for updating inline and cross-line components of the offset of the vessel relative to the preplot;

FIG. 20 is a flowchart of a method for steering a vessel that tows associated seismic equipment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vessel that tows at least a source array and plural streamers. However, the embodiments to be discussed next are not limited to this configuration, but may be applied to a streamer vessel that tows a source array and applies source steering to remove the errors due to the vessel navigation, or to a source vessel without source steering to perform, for example, undershoot on a 4-dimensional (4D) survey, or to a streamer vessel with no source steering, to a vessel in a multi-vessel WAZ configuration, to a vessel performing coil shooting, to standard 3D or other configurations.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In a standard 3D survey, when the vessel follows the pre-plots, the changes in the current will move the position of the streamers sideway in a different way from one survey line to the next. In the end, the changes in the current will create holes in the seismic coverage. To avoid this problem, the navigator may be instructed to steer the vessel so that it gets closer to the previous line to avoid the holes. This process is called in the art "steering for coverage." Usually, an area in the spread is chosen so that the coverage may be optimized for the near offsets (receivers closer to the source) or the mid offsets (receivers in the middle of the spread). Thus, instead of steering the vessel in a straight line and having the navigator correcting for current change, it would be far more efficient to initially steer the vessel so that a selected point in the spread, like the center of the source, or the center of the front end of the streamers, or any other point in the spread as will be discussed later, is following a straight line. The steering for coverage would be much more efficient as part of the effect of the current would be automatically corrected.

Figure 1A:
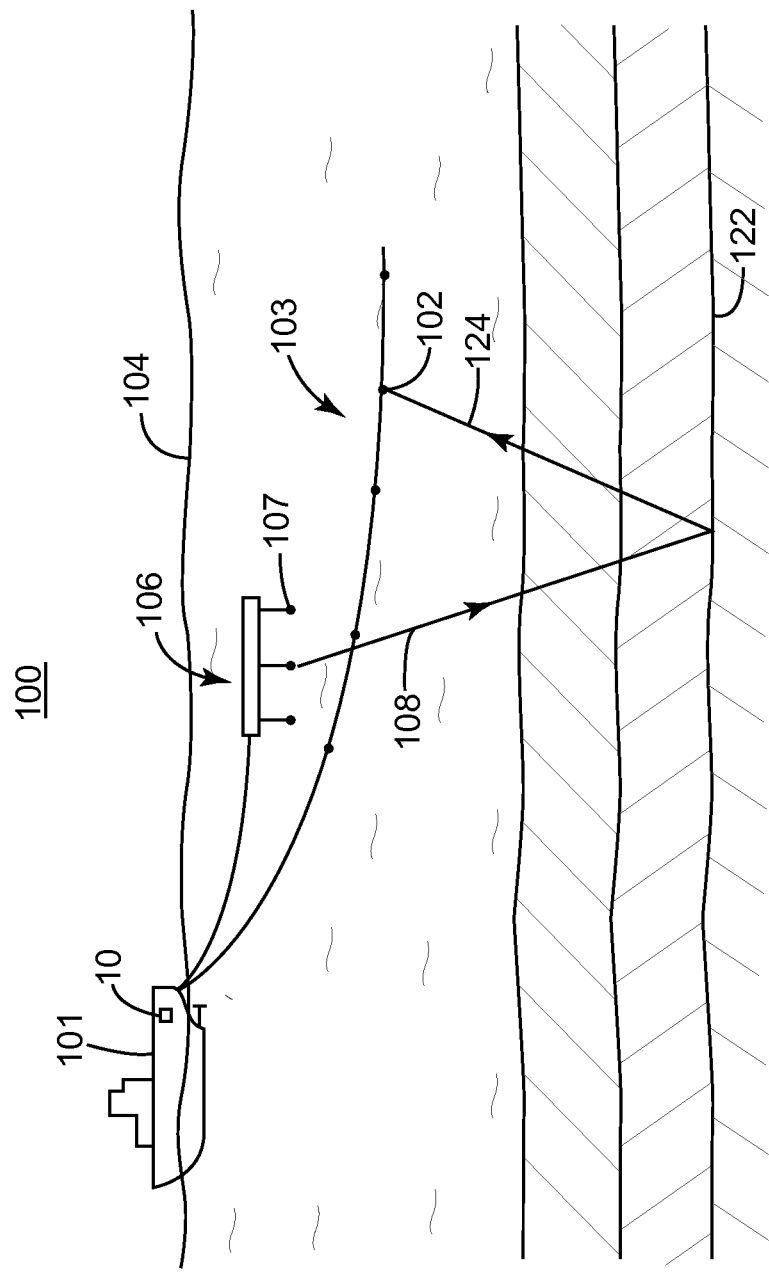
FIG. 1A is a schematic diagram of a state of art (Broadseis) seismic survey system.
Figure 1B:
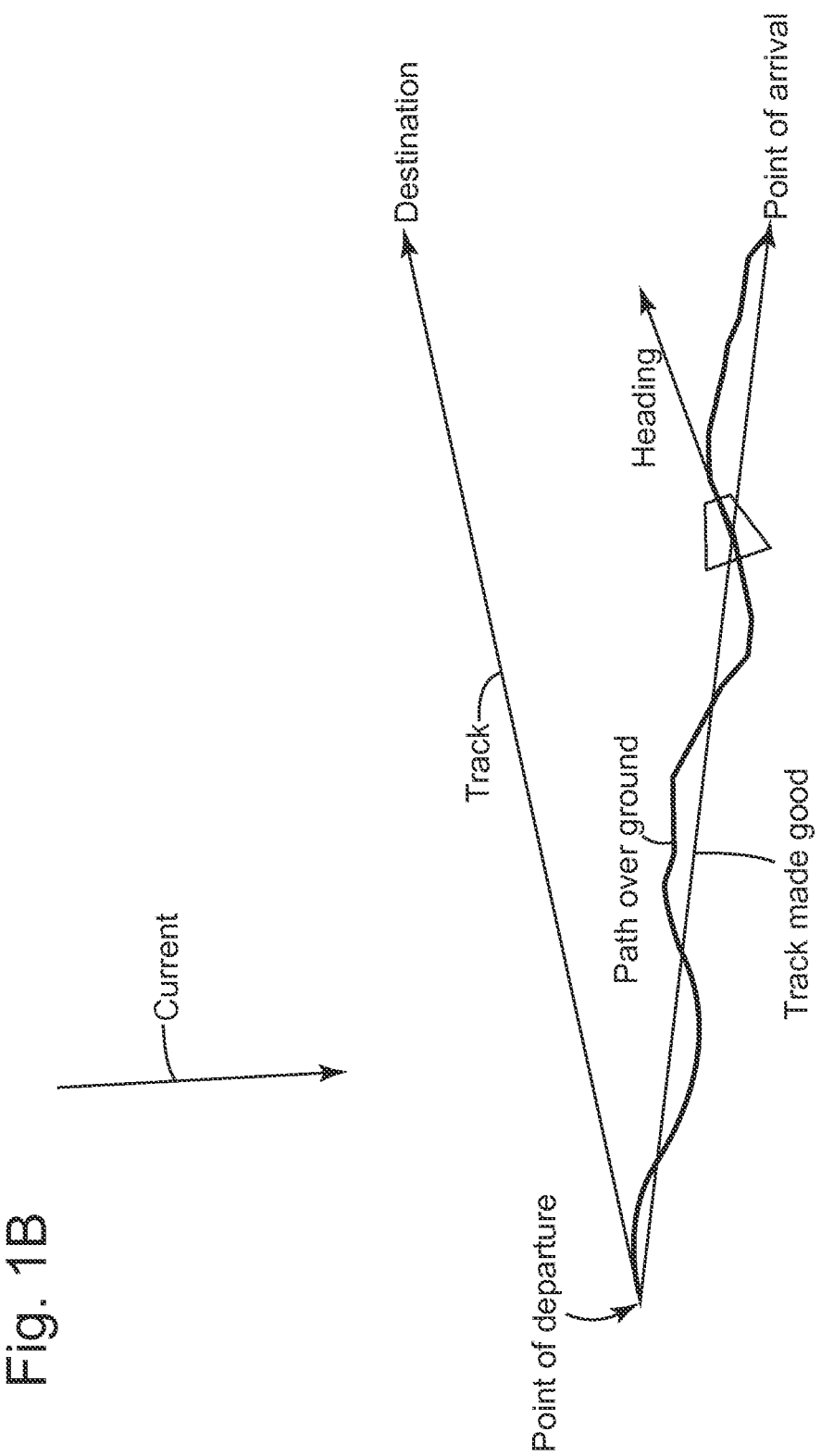
FIG. 1B illustrates various concepts related to movement of an object over water.

In the 90s, the Global Positioning System (GPS), a revolutionary navigation system, has been launched. Before that, the seismic systems in use did not have either the accuracy or real time availability to allow real time calculation of vessel's position and towed equipment position over the ground. At its beginning, the GPS signal accuracy for civilian use was degraded by what was known as Selective Availability. According to one or more embodiments, the availability of accurate and real time positioning systems, like the current GPS and RGPS (relative GPS system) is used for steering the vessel. For a long time, when the vessels were out of line of sight of land marks, they would be using dead reckoning. The vessels would adjust their position from time to time using some satellite fixes or celestial navigation. Until recently, when a vessel was offshore out of sight of the land marks, the only information available for navigation was the water speed and the heading, so the path over the ground was not known or used. The navigators were able to get some navigation fixes from time to time, using for example celestial navigation. Between the two fixes, the navigators were able to determine the mean course of the vessel: the course made good (see FIG. 1B), and the mean speed called the speed made good.

Latest technologies in marine seismic surveys need a simple, accurate, stable and robust process for steering a vessel so that towed marine equipment, e.g., a source array, follows a pre-determined track (pre-plot). In some other case, it would be more efficient to control the vessel navigation based on a point in the towed spread rather than on the vessel so that the towed spread follows a pre-determined track instead of the vessel as still currently done, as it would improve the coverage and the efficiency of the survey. This concept is not currently used by the existing seismic vessels because the main navigation software solutions tested are instable when requested to steer for a point in the towed spread instead of a point on the vessel. This is due to the way it is done and the reaction time of the towed spread. According to an embodiment, an advantage is to be able to use a point in the towed spread. For some marine seismic survey, there is a requirement that the source array follows the pre-plot, which is either calculated by the seismic contractor or is given by the company ordering the seismic survey. In either case, the pre-plot is calculated prior to starting to acquire the seismic data. For a single source array, it is desired that the pre-plot coincides with the actual trajectory of the source array. If the vessel tows two source arrays, the pre-plot is usually the succession of positions desired for each source alternatively but may be defined as the mid-position between the two source arrays, or the mid-position between two consecutive shoots of the two source arrays, etc. However, various factors that affect the marine equipment's actual path over the ground include, but are not limited to, ocean currents, wind, obstacles, hydrodynamic forces and a cable model (i.e., a model that describes the interactions between the source array and/or the streamer spread and the vessel during the towing process). Thus, according to an embodiment, the vessel is required to follow the pre-plot track of a marine equipment and as the position of the marine equipment at an instant t is measured and compared with a position of the towing vessel measured at a previous instant t−Δt, where Δt may be another amount of time, the vessel is requested to follow the pre-plot track displaced by a vector, where the vector may be the vector between the marine equipment's position at instant t and the vessel's position at instant t−Δt. In one application, time Δt may be calculated as a ratio of (i) an inline distance between the vessel and the source array and (ii) the water speed of the vessel. The offset can be considered to be a vector and it can be decomposed in various referential systems (e.g., easting-northing coordinates or inline-cross-line coordinates). All the calculations can be performed either in easting-northing coordinates or in local inline cross line coordinates. For simplicity, only the cross-line component is considered in the next embodiments. However, further embodiments would also address an inline component in addition to the cross-line component. Thus, the novel steering process is not limited to a cross-line offset, as later discussed. In the following, the offset shall be considered as a vector even if the figures illustrate it as a scalar.

Various methods for implementing this novel process are now discussed. The following embodiments are exemplary, trying to illustrate the novel concepts, and not intended to fully describe all possibilities for implementing such concepts. To facilitate understanding of the concepts, a simple system having a vessel and two source arrays are discussed. However, those skilled in the art would recognize that the concepts equally apply to a system that includes other marine equipment, e.g., more source arrays, streamers, birds, etc.

Figure 2:
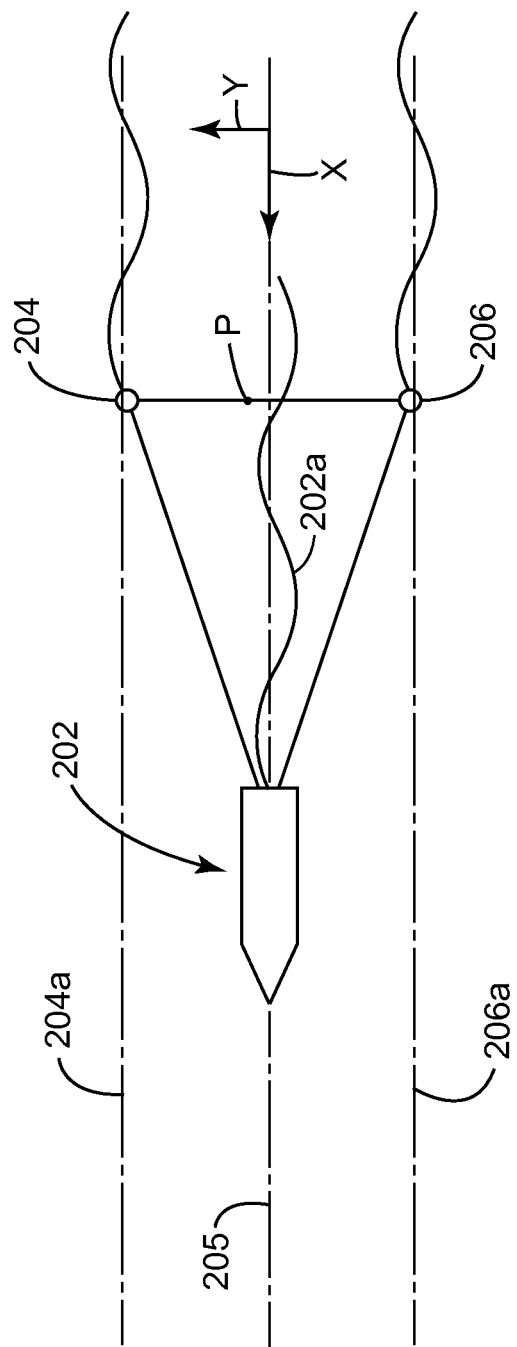
FIG. 2 illustrates a seismic survey system with two sources following a pre-determined track.

According to an embodiment illustrated in FIG. 2, there is a marine acquisition system 200 that includes a vessel 202 and two source arrays 204 and 206. FIG. 2 illustrates a past path over the ground 202a of vessel 202, and the expected or desired tracks (pre-plot tracks) 204a and 206a for source arrays 204 and 206, respectively. In some applications, the pre-plots 204a and 206a of each source array are replaced or completed by a single pre-plot 205, which represents the mid-point between source arrays 204 and 206. Under ideal conditions, as illustrated in FIG. 2, it is expected that source arrays 204 and 206 follow pre-plot tracks 204a and 206a within a couple of meters. Even with no wind, no current and no waves, just the inherent hydrodynamic forces and drag would deviate the vessel and the sources from their tracks. Note that these pre-plot tracks are usually calculated prior to deploying the seismic equipment for seismic acquisition while the vessel's path over the ground is calculated live using positioning technology such as GPS. Usually, the sources positions initial estimates are determined relatively to the vessels by technology such as RGPS (relative GPS) giving a bearing and distance to a reference point on the vessel (usually a GPS antenna). This leads to the determination of a real time estimate of the paths over the ground of the sources.

However, due to real conditions, e.g., wind, waves, ocean currents, vessel speed which may control the separation between several sources, interaction between vessel and source arrays, etc., the source arrays do not follow pre-plot tracks 204a and 206a even if the vessel follows the pre-plot track 205. According to a method to be discussed next, the vessel is steered so that the source arrays follow the pre-plot tracks.

The method is based on a few observations made by the present inventors. One such observation is related to the fact that the single towed source or the middle of the two source arrays paths follows the vessel's path relative to the water, filtered from the high frequency vessel movements. Relative to the ground (i.e., Earth), the towed source array can follow a path different from the vessel's path if there is any current and other environmental conditions introducing a variable offset between the two paths (i.e., the vessel's path and the source array's path) Towed source array movements are filtered by a transfer function F (to be discussed later) compared to vessel path.

Another observation is related to the fact that vessel's small movements are filtered out by the towed source array. Still another observation is that there is a relationship between the vessel's movement and the source array's movement (or more generally, the steered point movement, where the steered point can be chosen as discussed next) that can be represented by a cable model. The steered point is a virtual or real point that can be associated with a physical point of the source array or the streamers or any other towed marine equipment, but also it can be associated with a point given by the geometry of the spread, i.e., the mid position of an imaginary line that connects two source arrays, or the source array with a streamer, or a geometrical mid-point of the streamers. In other words, the steered point may be associated with the spread (where the spread is considered to include the source arrays) in any way, but in such a fashion to inherit the movement of the spread or part of it. Thus, when the cable model is used, i.e., a mathematical model that takes into consideration the physics of one or more of the cables and lines connecting the source array to the vessel, and/or the streamers to the vessel, the steered point captures the interaction between the vessel and the spread or part of the spread, even when the steered point is a virtual point.

Based on these observations, a vessel's track can be adjusted in real time based on the steered point's pre-plot and the cable model. If the pre-plot is close to a straight line or a slightly moving straight line, which is the general case for a marine survey, it can be assumed that the source array is following the vessel, and the vessel's high-frequency movements (e.g., movement having a wavelength less than 100 m inline and several meters cross-line or less than the characteristic distance of the system that is the distance between the vessel and the steered point) are not reproduced by the source array. Similarly, it is assumed in this method that the source array's high-frequency movement (e.g., the movement induced by waves) is "independent" of the vessel's movements.

Based on these observations and as will be mathematically demonstrated next, a steered point P (e.g., a point associated with a source array or the spread or any other marine equipment—note that in one embodiment, steered point P is steered automatically to maintain a given cross-line distance from a given pre-plot) is following the vessel's mean path with some local perturbations that have a null mean, which means that the steered point's mean velocity relative to the ground $V_{pg}(t)$ is equal to the vessel's mean velocity to the ground $V_{vg}(t)$, and that steered point P and the vessel are globally following straight parallel paths. Based on this feature, a variation of the offset between the steered point and the vessel's past path would be used to adjust the vessel's track. The vessel's track is understood herein to mean the pre-plot of the source array or of the steered point P shifted by a given offset that is calculated as now discussed. In the following discussion, it is understood that there are two ways of shifting a track by a given offset based on the way the autopilot works. One can move a track cross-line and expect the vessel to follow the track, or one can expect the vessel to follow the track at a cross-line distance. The track being defined also by an azimuth, the azimuth may be determined after taking into account an inline distance. Thus, it is equivalent to shift the track to follow by an offset (vector, inline distance or cross-line distance) or to ask the vessel to follow the track with at a given offset.

These results are now mathematically demonstrated. Consider the vessel's velocity relative to the water as being $V_v(t)$, $V(t)$ being the velocity if there is no wind and no drift, and $V_d(t)$ being the vessel's velocity relative to the water due to wind, then the following equation holds:

$$V_v(t)=V(t)+V_d. \qquad (1)$$

If $V_c(t)$ is the current's velocity (relative to the ground) and $V_{vg}(t)$ is the vessel's velocity relative to the ground, then the vessel's velocity relative to ground is given by:

$$V_{vg}(t)=V_c(t)+V_v(t). \qquad (2)$$

If $V_p(t)$ represents the steered point's velocity relative to the water and $V_{pg}(t)$ is the steered point's velocity relative to ground, then the steered point's velocity relative to ground is given by:

$$V_{pg}(t)=V_c(t)+V_p(t). \qquad (3)$$

Considering a period of time during which the current is constant and also considering that there is no wind, i.e., $V_c(t)=V_c(0)$, equations (2) and (3) can be rewritten as:

$$V_{vg}(t)=V_c(0)+V_v(t) \qquad (4)$$

$$V_{pg}(t)=V_c(0)+V_p(t). \qquad (5)$$

If during this period of time the vessel's velocity is staying close to a mean value, i.e., there is a white variation $\delta V_v(t)$, then the vessel's velocity relative to ground can be expressed as:

$$V_{vg}(t)=V_c(0)+V_v(0)+\delta V_v(t) \qquad (6)$$

and the steered point's velocity relative to ground can be expressed as:

$$V_{pg}(t)=V_c(0)+V_v(0)+\delta V_p(t), \qquad (7)$$

with $V_p(0)$ being equal to $V_v(0)$ due to the fact that the current is constant and no wind, and $\delta V_p(t)$ is a variation of the steered point's velocity relative to the ground. This term $\delta V_p(t)$ can be written as:

$$\delta V_p(t)=F(\delta V_v(t))+\delta V_{pw}(t), \qquad (8)$$

where F is the transfer function between the vessel's movement and the spread's movement and $\delta V_{pw}(t)$ is the steered point's movement due to cable model, wind gusts, etc. In other words, steered point's movement about a mean value is a result of (i) vessel influences captured in term $F(\delta V_v(t))$, where function F may have different forms, and (ii) environment influences captured in the term $\delta V_{pw}(t)$.

The transfer function may be considered, in a first approximation, to remove the vessel's high-frequency movements and to take into consideration a delay corresponding to the time it takes for the steered point P to reach the vessel position cross-line or inline-wise. Note that it is customary to consider inline direction X to correspond to the vessel's track, and cross-line direction Y to be an axis substantially perpendicular to the inline direction, in a plane substantially parallel with the water surface as illustrated in FIG. 2.

If the vessel's velocity variation $\delta V_v(t)$ includes only the high-frequency and small movements, then equation (8) becomes:

$$\delta V_p(t)=F(\delta V_v(t))+\delta V_{pw}(t)=0+\delta V_{pw}(t) \qquad (9)$$

because the transfer function removes the high-frequency and small movements. In this case, equation (7) becomes:

$$V_{pg}(t)=V_c(0)+V_v(0)+\delta V_{pw}(t), \qquad (10)$$

which can be rewritten as:

$$V_{pg}(t)=V_c(0)+V(0)+\delta V_{pw}(t), \qquad (11)$$

when there is no wind.
Combining equations (6) and (11) results in:

$$V_{pg}(t)=V_{vg}(t)-\delta V_v(t)+\delta V_{pw}(t), \qquad (12)$$

which indicates that a difference between the steered point's velocity relative to ground $V_{pg}(t)$ and the vessel's velocity relative to ground $V_{vg}(t)$ is given by some local perturbations $-\delta V_v(t)+\delta V_{pw}(t)$ that have a zero mean. Thus, it follows that the steered point's mean velocity is equal to the vessel's mean velocity, i.e., $$\mathrm{Mean}(V_{pg}(t))=\mathrm{Mean}(V_{vg}(t)). \qquad (13)$$

Therefore, equation (13) proves that the steered point P and the vessel follow straight parallel lines having a given cross-line offset during a seismic survey, if the vessel follows a straight line track.

Figure 3:
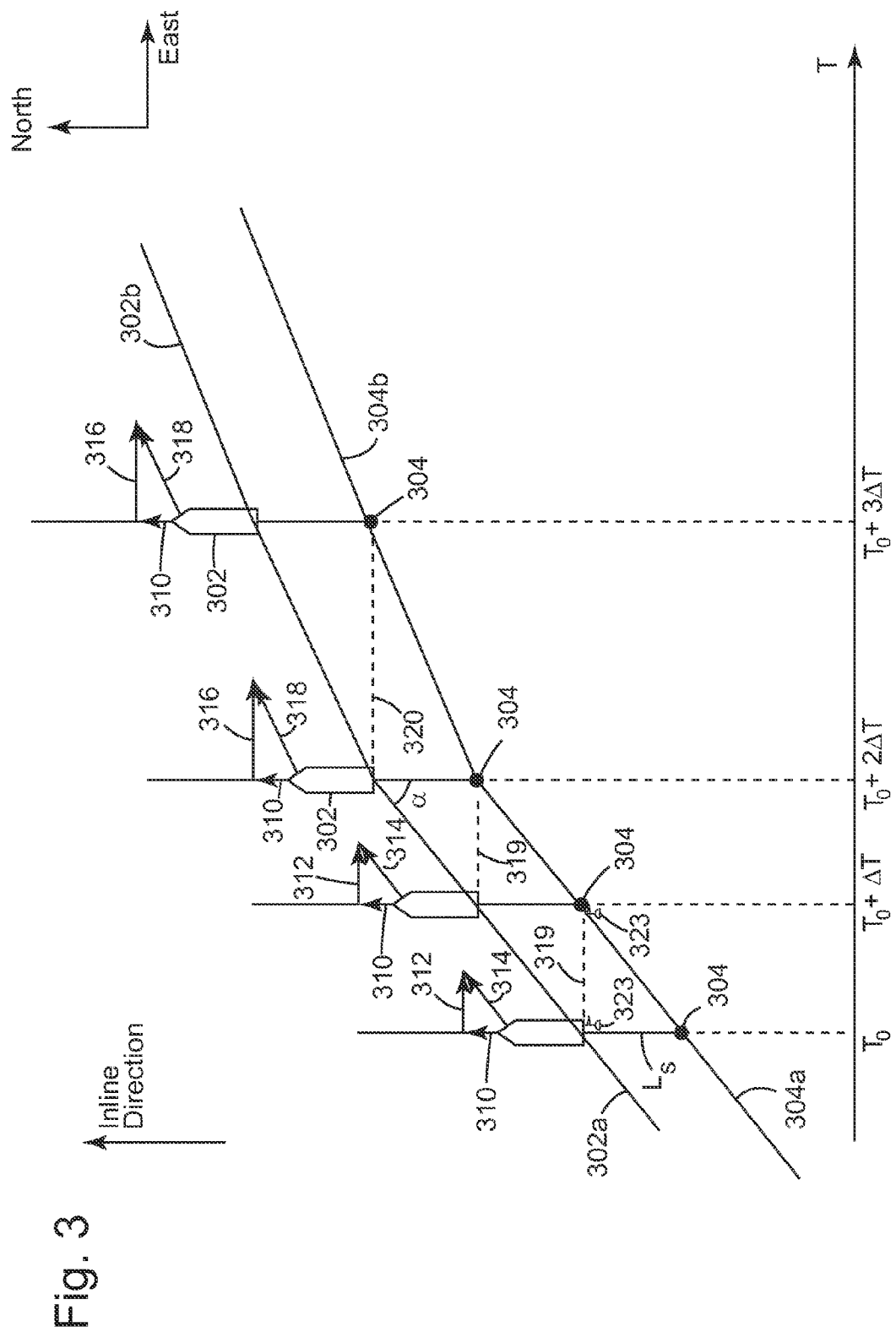
FIG. 3 illustrates a streamer vessel's path being parallel to a steered point's track.

This conclusion is illustrated in FIG. 3, which shows a marine seismic acquisition 300 including a vessel 302 that tows a marine source array 304. The vessel's heading in this embodiment is North and it does not change for the purpose of this embodiment. The vessel's speed relative to the water is considered to be the same in this embodiment. Thus, the vessel's speed relative to the water and the heading are both represented by vector 310. FIG. 3 also shows an East bound current. The current is always East bound in this embodiment, but its value suddenly increases from a first value represented by vector 312 to second value represented by vector 316, at time T0+2Δt. In this respect, note that FIG. 3 shows four different locations for vessel 302, at times $T_0$, $T_0$+Δt, $T_0$+2Δt and $T_0$+3Δt. The increase in the water current from 312 to 316 can happen, for example, in shallow water, as the current speed increases when the depth decreases so that the same volume of water travels. The vessel's path over the ground before time T0+2Δt is 302a while the source array has followed, during the same time, the path over the ground 304a, which is substantially parallel to path over the ground 302a. These paths are relative to ground as noted above. FIG. 3 also show the vessel's velocity 310 relative to water (which is unchanged in this embodiment), the water current's velocity changing from 312 to 316, and the vessel's course made good (CMG) 314, which is the vessel's velocity relative to ground. Note that an angle α between CMG 314 and vessel's speed relative to water 310 is exaggerated in the figure, since this angle is usually smaller than 10°, but in large current areas it can reach 45° or even more.

What has been observed in real data and what is the basis of an embodiment is that the towed equipment followed the vessel's path on the water as long as the change of course stays small, which is always most of the time the case for a standard survey performed along straight pre-plot or for which the base line was based on straight pre-plots. This means that if at T0 the vessel drops a buoy 323 with a flag, at T0+Δt, the towed equipment 304 reaches the buoy 323 as the buoy has traveled East due to the current 312. In the figure, Δt is the time corresponding to the inline distance Ls between the vessel 302 and the towed equipment 304, and Δt is calculated by dividing distance Ls with the vessel's speed relative to water 310.

Thus, if at T0 the vessel is oscillating to the West from a median straight line, at T0+Δt, the towed equipment is oscillating to the West from a median straight line.

The distance or offset 319 is the vector between the towed equipment 304's position at time T0+Δt and the vessel 302's position at time (T0+Δt)−Δt, i.e., past position along path 302a at time $T_0$, where Δt is the time it takes the towed equipment 304 to reach, on the water, the inline position of the vessel at time $T_0$. The same time Δt it takes the dropped buoy 323 to reach the towed equipment's position at time T0+Δt.

An advantage of this embodiment is that the offset 319 stays constant even if the vessel is oscillating around a straight line. This means that in the present case, the offset 319 is constant from T0 to T0+Δt and, thus, no change needs to be done to the vessel's steering whatever the oscillations of the towed equipment around the preplot.

In other words, this embodiment removes the effect of current and wind and the vessel and spread system without ever measuring the current or the wind. That way the system is impervious to those measurement errors and is more simple and robust.

At time T0+2 Δt, the current velocity increases from 312 to 316. As noted above, vessel's heading toward North does not change. The vessel's speed 310 relative to water also does not change and remains the same at T0+3Δt. The new vessel course made good and speed made good is 318. The speed made good has increased so the vessel is travelling a longer distance on the ground during the time Δt. The new offset 320 is larger than the previous offset 319. As mentioned earlier, although those types of current changes may be unusual, they are still possible.

With this current change, no change is made to the vessel steering. The vessel and towed equipment paths over the ground are 302b and 304b, respectively, after time $T_0$+2Δt. The offset is increasing from 319 to 320, after the change of current speed at $T_0$+2Δt till $T_0$+3Δt, then it stays constant.

However, for the steered point to follow a same line relative to ground (because the steered point should follow the pre-plot relative to the ground even when the water current's velocity changes), the vessel's velocity 310' relative to water needs to change its direction as illustrated in FIG. 4 so that new vessel's velocity course made good and speed made good 318' relative to ground has the same direction as 314. This change results in source array 304 following a new path over the ground 304b, which is still parallel to vessel's new path over the ground 302b, once the vessel has reached its new course. During this transition illustrated in FIG. 4, the paths over the ground 402c and 404c of the vessel and towed equipment, respectively, are not parallel as the current's speed (or set) is not the same at a moment t and t−Δt. The offset vector increases from 319 to 320 during that period as discussed above with regard to FIG. 3. In the example of FIG. 4, the current's speed is quite high relative to the vessel's speed relative to the water, even higher after the current change. This scenario is unlikely in practice as it is difficult to perform a survey with a current speed higher than the vessel's speed, but it better illustrates the features discussed. For this reason, with usual speed values and offset, it would take about a quarter of an hour for the vessel to reach path 302b, so that the towed equipment is back on the preplot.

The examples illustrated in FIGS. 3 and 4 have been built with the assumption that the vessel was already at its maximum speed (over water). Even though several embodiments may use the novel offset vector 319 or 320, it is common to use PID controllers that steer the vessel at a certain cross-line distance from the pre-plot. Thus, it might be useful to convert the offset vector in a cross-line distance to be fed to the vessel's steering device. However, a crossline offset $CO_1$ before the current's velocity change is now different from the new cross-line offset $CO_2$. The difference Diff=$CO_2$−$CO_1$ between the two cross-line offsets is the amount with which the vessel's new track should be offset from the pre-plot to maintain the towed equipment 304 on the pre-plot path 401 for the conditions noted in this embodiment.

The above-discussed relation between ground trajectories and water movement is one of the novel concepts related to the steering of the towed equipment. In this regard, note that the vessel and the towed equipment are following approximately the same path on the water referential. However, the water referential is in movement relative to the ground. Therefore, in order to follow a pre-plot track on the ground referential with the steered point, the vessel should compensate for the relative movement of the water relative to the ground. Those skilled in the art will appreciate that the vessel should also compensate for the leeward motion due to wind.

The cross-line offsets $CO_1$ and/or $CO_2$ can be easily determined for straight pre-plots. Otherwise, to determine the vector offset 320, one has to determine the time Δt needed for the source to reach at time t+Δt the vessel's position at time t. In FIG. 4, the vessel travels distance 405 relative to the ground, after the current change, during time interval Δt.

In the above discussion, it was assumed that steered point P is fixed relative to the geometry of the towed equipment, i.e., spread or source array or whatever marine equipment is selected. The steered point P may be defined in various ways, depending on the need of the survey, as will be recognized by those skilled in the art. Thus, in one application, the steered point may be the center of the source, i.e., the 3D coordinate position of the center of a plurality of individual seismic elements that form a source or a source array. In another application, the steered point P is defined as the geometric source array center, i.e., the average X and Y positions of all the guns in the source array. In still another embodiment, the steered point may be the pressure source array center, i.e., the weighted average of all the X and Y positions of the guns defining the source array by the primary peak amplitude of the notional source signature associated with each gun. If a gun is defined as spare in the source array, it has a notional signature with an amplitude of 0. In yet another exemplary embodiment, the steered point may be the energy center of the source array, i.e., the weighted average of all the X and Y positions of the guns defining the source array by the total energy of the notional source signature associated with each gun. If a gun is defined as spare in the source array, it has an associated energy equal to 0. Note that for a given source array, the X and Y positions of the geometric source array center, the pressure source array center and the energy center of the source array may be different. In another embodiment, the steered point may be a point in between the source center and the center of the streamer heads or the center of the streamer heads.

Figure 5B:
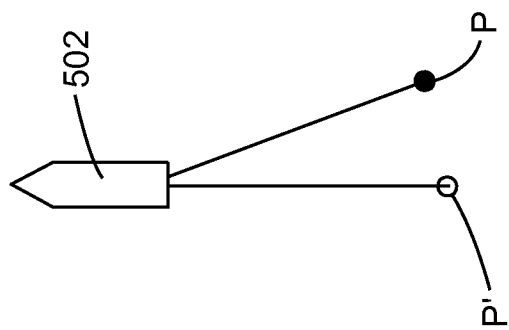
FIGS. 5A and 5B illustrate a virtual point's track relative to a steered point's track.
Figure 5A:
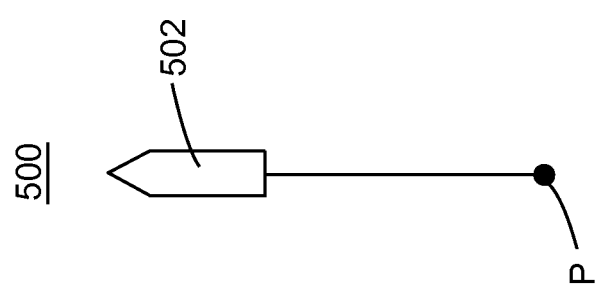

However, it is possible to have, for example, a case in which the source array is actively steered, i.e., its position is adjusted relative to other members of the spread. For this case, the virtual steered point is selected to be P', which represents the position of point P if there was no steering. FIG. 5A illustrates a steered point P, without any active steering, being towed by vessel 502, while FIG. 5B illustrates the same point being actively steered to occupy a new position while the virtual steered point P' has the position that point P would have had if active steering were not involved. One should note that the steered point does not need to be related to any active steering, like a source steering or a streamer steering. The performance of the invention is such that the source may not require any actual steering with winches, active deflectors or active hydrodynamic bodies to follow the preplot. An active steering method using winches is described, for example, in U.S. Patent Application 2013/070557.

Figure 6B:
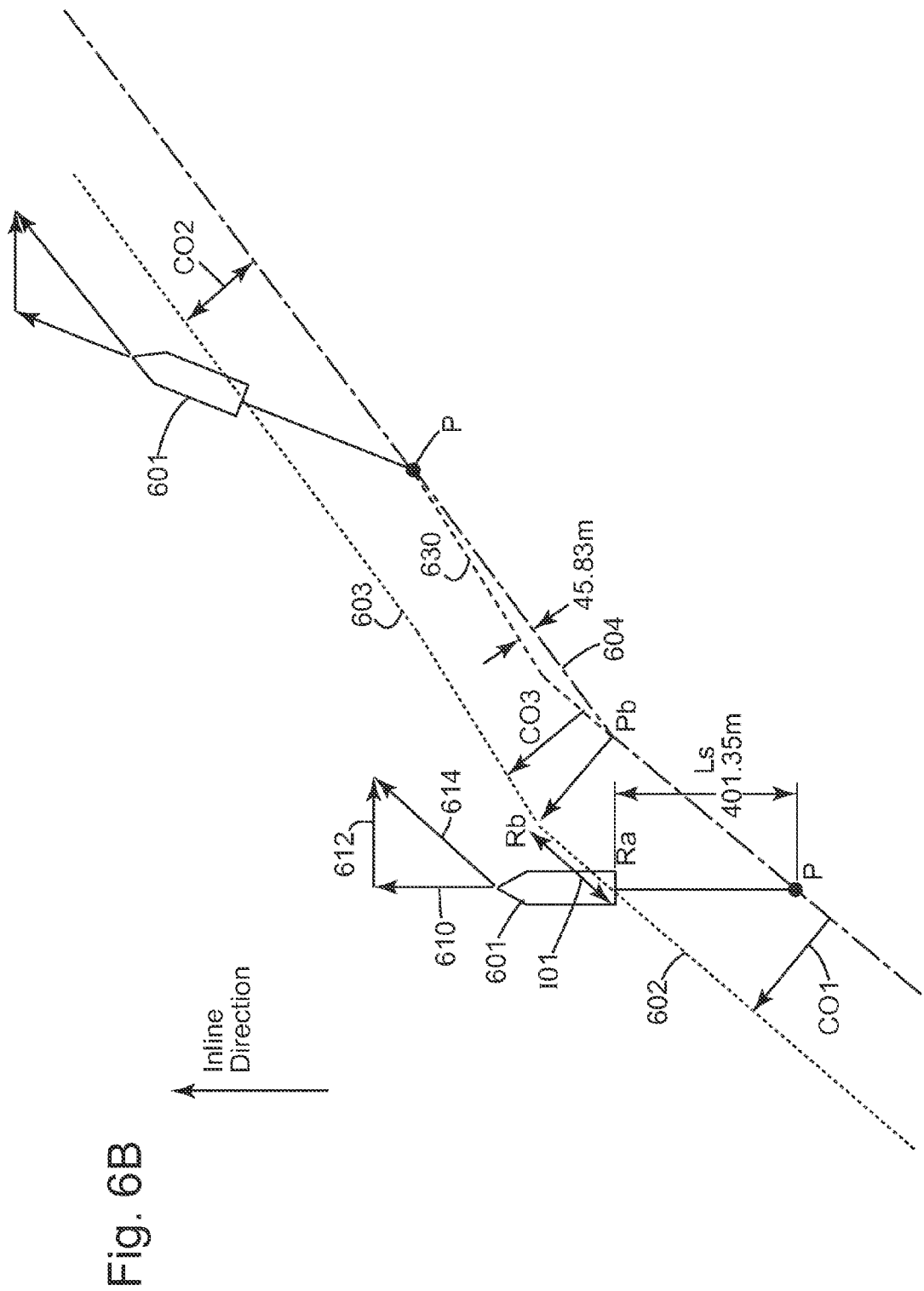
FIG. 6B illustrates using a cross-line offset for determining the vessel's track relative to a steered point's track.

Other embodiments are discussed with regard to FIGS. 6A and 6B, and these embodiments take into consideration what happens when there is a change in the pre-plot track of the source arrays. FIGS. 6A and 6B show acquisition system 600 that includes vessel 601 and steered point P. Vessel 601 has a velocity relative to water 610 (that coincides with its heading) which, when combined with water current's velocity 612, produces vessel's ground velocity 614. The steered point P is required to follow pre-plot 604, which includes two "legs" or two straight segments 604a and 604b.

According to one embodiment, an offset vector 619 is computed between the position of the vessel at time T and the position of the source array at time T+Δt, where Δt is the ratio of (i) the steered point P's inline distance Ls to the vessel and (ii) the water's speed 610. The offset vector 619 corresponds to the positions of the buoy 623 which would be dropped at time T from the vessel and would be reached by steered point P after time interval Δt. Offset vector 619 corresponds to the current movement between instants T and T+Δt.

Thus, according to one embodiment, the pre-plot track 604 is shifted along the direction of the offset vector 619 to calculate track 602 to be followed by the vessel. If there is a change in direction in the pre-plot 604, it does not change track 602, but rather changes track 602's direction. The vessel has to change its course to be able to follow the change of direction of 602, which is handled by the PID controller 10 of the vessel.

Note that vector 619 is the sum of an inline offset $IO_1$ and a cross-line offset $CO_1$. When the direction of the pre-plot track 604 changes at location 620, the offset vector 619 does not change, but the offset values change from $CO_1$ to $CO_2$ and from $IO_1$ to $IO_2$. If the PID controller 10 takes as input the course to be followed, the current distance from the vessel 601 to the track to be followed and the cross-line offset at which the vessel should follow the track, then, $CO_2$ is the new target sent to the controller 10.

In a different embodiment illustrated in FIG. 6B, instead of determining the offset vector 619 as in FIG. 6A, only the cross-line offset $CO_1$ is calculated and fed to the controller 10 for adjusting the vessel's path. An advantage of this embodiment is that it is easier to determine $CO_1$ as it does not require knowing the vessel's water speed (which is usually known on a seismic vessel), it just requires recording the vessel's path over the ground and steered point P's path over the ground. In case steered point P's position depends on some active steering, then it is understood that in one embodiment, steered point P's position is replaced by virtual point P' position discussed above with regard to FIG. 5B.

In this embodiment, steered point P's pre-plot track is moved cross-line by $CO_1$ to a new track 603 to be followed by the vessel. The vessel will change its direction at point Rb instead of point Ra as in the previous embodiment illustrated in FIG. 6A, the distance between the two points Ra and Rb being $IO_1$. Once the steered point P goes beyond point Pb, the cross-line offset is decreasing to $CO_3$ and thus, the vessel's track to follow is updated accordingly, i.e., it is moved cross-line so that the new cross-line distance to pre-plot 604 is $CO_3$.

Then, the vessel is given track 603 to follow. If the vessel manages to follow that track, it means that steered point P follows track 630. This embodiment shows that not knowing the inline offset $IO_1$, results in a deviation from the track 630 followed by steered point P versus the pre-plot track 604. For this example, the cross-line deviation would reach 40 m, for a steered point P 400 m behind the vessel, a cross current speed of close to 5 knots, a vessel water speed of 5 knots and a change of pre-plot track direction of 13°. This conditions are quite extreme for a real seismic survey, because with a current speed of 5 knots and a maximum vessel speed of 5 knots there is almost impossible for the vessel to turn and come back to shoot the next line. In usual conditions, the deviation would be less than 10 m. Thus, one advantage of this embodiment is that it works well with a source steering device and it does not require a large and/or complicated system to be implemented.

As mentioned above, when there is no wind, vector 619 corresponds to the movement of water due to the current between times T and T+Δt. It would be possible to use a current measurement from a current profiler for example. However, the current is usually not the same along the water column. The current at the source depth may be different than the one at the vessel depth. One advantage of this embodiment is that it determines the effect of the current on the seismic system comprising the vessel, the cables connected to the towed bodies and the towed bodies used for the determination of steered point P. This effect is the one which is corrected which renders the system more efficient than the one based on current measurements. A degraded version of one or more embodiments could use current measurements.

Figure 7C:
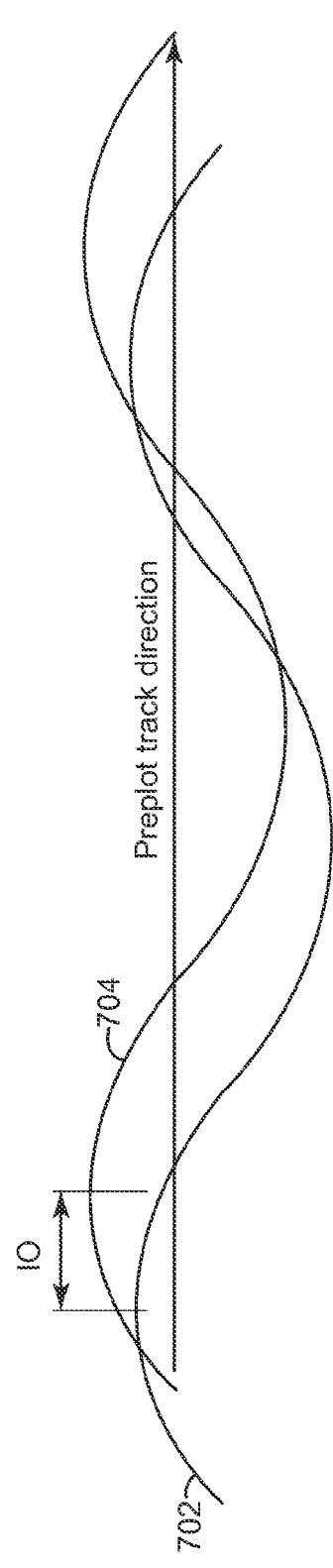

In the embodiment illustrated in FIG. 6B, only the cross-line offset between the steered point's position at current time t and the vessel's position at previous time t−Δt has been calculated. However, there are instances when the offset has an inline component relative to the course made good 710, as now discussed with regard to FIGS. 7A-D. In most instances, the steered point's path over the ground 702 and the vessel's path over the ground 704 are similar with a cross-line offset CO as illustrated in FIG. 7A. However, if there is, for example, an inline current during the seismic survey relative to the course made good 710, an inline offset IO appears between the path over the ground 702 and 704 as illustrated in FIG. 7B. In this case, the cross-line offset cannot simply be measured along a cross-line direction, because the cross-line offset CO would depend on the position of the cross-line along the inline direction, as illustrated by cross-lines 706 and 708. Thus, the paths over the ground 702 and 704 have to be first aligned to each other with the inline offset IO (i.e., one path is shifted inline relative to the other) and then the cross-line offset may be measured as in FIG. 7A. For this situation, the inline offset is first calculated, then the past path over the ground of the vessel is adjusted (e.g., shifted) relative to the steered point's path over the ground based on the inline offset, and then the cross-line offset between the two adjusted paths is calculated. Thus, the vessel's track to be followed may be adjusted with the cross-line offset calculated based on the inline offset.

Figure 7D:
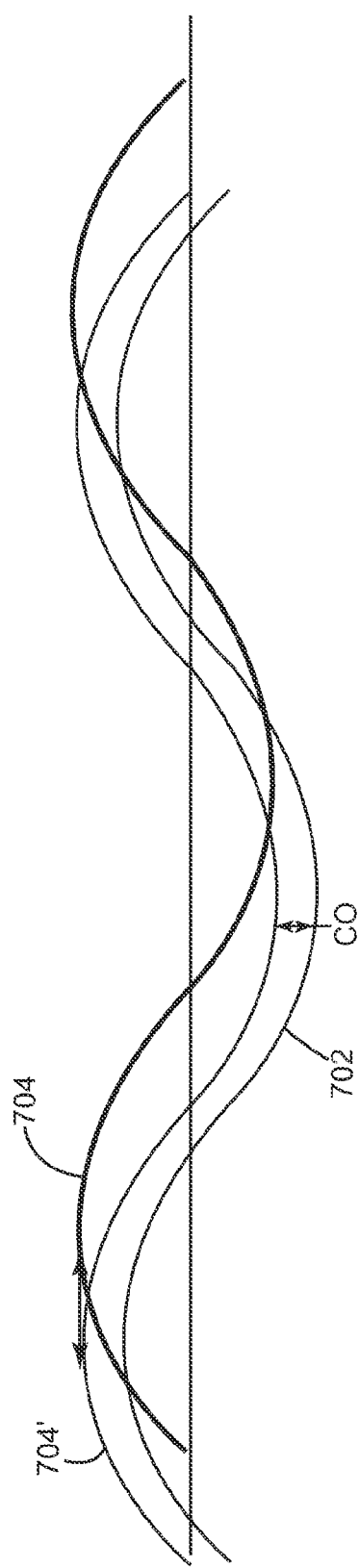

Actual survey lines do not usually display such deviations from a straight line, and thus, the cross-line scale has been exaggerated for illustration purposes. In FIG. 7B, there is an inline offset IO and the cross-line offset is null. In FIG. 7C, there is both an inline offset IO and a cross-line offset CO. In FIG. 7D, the vessel's path over the ground 704 has been translated according to the inline offset IO as path 704'. That way, the cross-line offset CO is now displayed clearly. The cross-line offset may be used for manual operator control.

The above calculations may be performed using one or more software programs in one or more steps. For example, in one application, there is one software program dedicated to output the positions of the different points of the seismic system, one software program that compares the steered point's path over the ground and the vessel's path over the ground, etc. This or other software programs may then calculate an offset for the actual steered point's position at the current time t and vessel's position at a previous time $t-t_n$, and determine a variation of the offset for adjusting the vessel's track with the offset variation. However, the determination of the cross-line and inline offsets can be determined graphically and entered in/sent to currently available navigation software and vessel PID controllers for adjusting the vessel's track to be followed.

A method for driving a vessel towing seismic equipment so that a steered point is maintained on the pre-plot track is now discussed with regard to FIG. 8. In step 800, the vessel tows marine equipment. A steered point (or point of interest) P is selected to be monitored and also steered so that it follows the pre-plot track. While the seismic survey progresses, a cross-line offset CO at time t is calculated in step 802. In one application, the cross-line offset CO is calculated between a current position of the steered point P at time t, and a position of the vessel at a previous time $t-t_n$, where $t_n$ may have any value, e.g., 10 s, 12 minutes, etc. The previous time $t-t_n$ depends on the characteristics of the seismic survey, e.g., vessel's speed, distance between vessel and source array, etc, and is selected so that the position of the vessel at this previous time coincides, along an inline direction, with the current position of the steered point, at a same inline position. In other words, the previous time $t-t_n$ is selected so that both the steered point P at current time t and the vessel's position at previous time $t-t_n$ have the same inline coordinate relative to the ground, as illustrated, for example, in FIG. 3.

In another embodiment, $t-t_n$ is selected so that both the steered point P at current time t and the vessel's position at previous time $t-t_n$ have the same inline coordinate relative to the water referential. The water referential is moving relative to the ground referential with the current's velocity.

In step 804, a variation δ of this offset with time F(CO(t)−CO(t−tn)) is determined, i.e., after selecting the transfer function F, $t_n$ represents the last time an offset has been sent to vessel controller. The transfer function may be selected to filter out high-frequency oscillations of the vessel. In one application, the transfer function is the unity. A low cut filter, such as Butterworth filter, can be applied to the offset vector so that positioning measurement noise and high-frequency movement of the vessel are not taken into consideration during the computation process. In one application, the cut filter could be 1/120s. In step 806, the calculated variation from step 804 is applied to the vessel's current position so that the steered point's path over the ground is maintained as close as possible to the steered point's pre-plot track. In step 808, the vessel's automatic pilot implements the track correction (i.e., calculated variation δ from step 804). Note that the above steps may be implemented directly into the vessel's automatic pilot. However, in one application, a dedicated software and/or hardware configuration may be implemented to compute cross-line offsets, calculate their variations and implement the offset variation to update the vessel's track to be followed. Other implementations may be possible, for example, dedicated software and/or hardware for calculating the offset variation and human implementation of this variation. In one application, when the dedicated software and/or hardware is tasked to automatically implement a vessel's track to be followed corrections, the algorithm periodically (e.g., every second or couple of seconds) calculates the offsets and offset variations, and implements a change in the vessel's track to be follow only if the offset variation is larger than a given threshold, e.g., over 1 m. All corrections below the threshold are not implemented.

If for any reason there is an inline offset between the steered point P's current position and the vessel's past position at past time $t-t_n$, the following method for steering the vessel may be implemented. The inline offset can result due to, for example, an inline current. The water reference system has an inline velocity compared to the ground reference system. Therefore, the vessel's track to be followed and the steered point's track have an inline offset in the ground reference system.

Figure 9A:
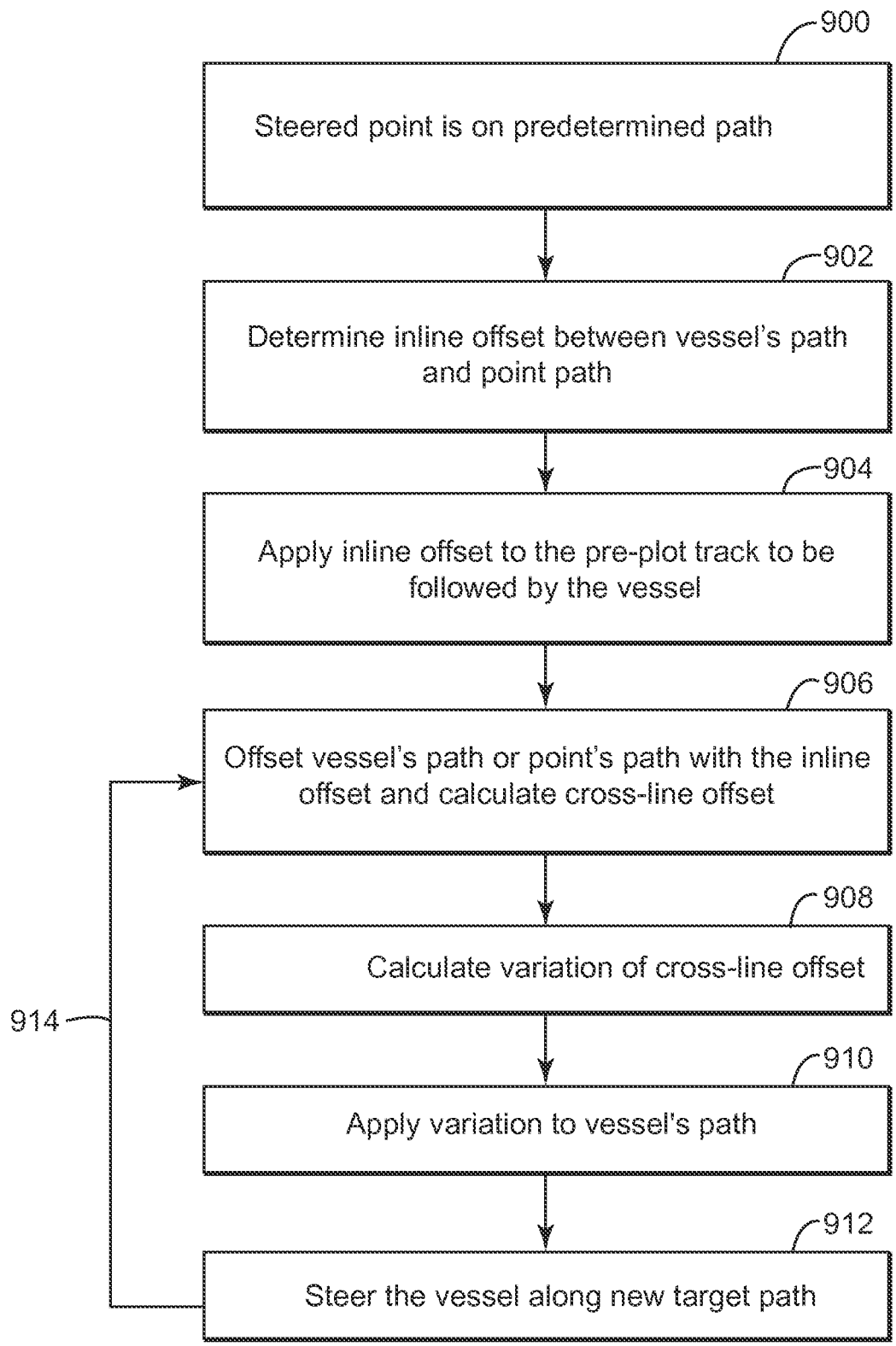
FIG. 9A is a flowchart of another method for steering the vessel based on the cross-line variation between the vessel and the steered point.

The embodiment illustrated in FIG. 9A is useful for a graphical presentation and manual control of the cross-line offset sent to the vessel's PID controller. As presented in FIG. 7B, when there is an inline offset, it is difficult for the operator to see and determine the cross-line offset. This method solves that problem and offers a solution for determining the cross-line offset. According to FIG. 9A, it is assumed that the vessel has performed a line change in step 900 and the steered point is on the pre-plot track and the vessel is now ready to start a new line for collecting seismic data. Then, in step 902, an inline offset between the vessel's past position and the steered point's current position is determined. Note that this inline offset is not the distance between the vessel and the steered point along the inline direction, but the inline offset between their paths over the ground, which may be zero even if the inline offset between the vessel and the steered point is on the order of tens or hundreds of meters. In step 904, in case the pre-plot track is not a straight line (or almost a straight line), the inline offset may be taken into account by moving the pre-plot track to be followed by the vessel by the inline offset.

In step 906, for calculation purposes or graphical determination purposes, the steered point's path over the ground is offset with the inline offset (or the other way around) and the cross-line offset CO between past vessel path over the ground and the current translated steered point position is determined or calculated. The offset can also be considered as a vector having the cross-line component and the inline component. Note that this vector can also be expressed in geographical coordinates like easting northing. The offset vector can be smoothed by a low cut filter such as a Butterworth filter. Further note that this step may be performed by a processor and, thus, one of the representations of the paths over the ground is shifted with the inline offset and not the actual path of the vessel or steered point. In other words, the inline offset is applied to the path over the ground representation in the processor and/or on the screen and/or graphical interface, and the cross-line offset is calculated based on the shifted representation of the vessel's past path over the ground and the representation of the steered point's path over the ground. In one application, the vessel's past path over the ground representation is moved according to the inline offset and then the cross-line offline CO is calculated relative to the steered point's position at current time t. If the steered point's position is associated with a dynamically steered marine element, a virtual point is considered instead of the steered point as discussed above with regard to FIGS. 5A-B. In step 908, the calculated cross-line offset CO is filtered similar to step 804 so that a variation δ of the offset CO is given by $F(CO(t)-CO(t-tn))$, and in step 910, the current variation $F(CO(t)-CO(t-tn))$ of the offset is applied to the source arrays' pre-plot track to obtain the track to be followed by the vessel. In other words, prior to step 910, the vessel is instructed to follow the source arrays' pre-plot with a given cross-line offset CO ($=F(CO(tn))$) and in one application the source array pre-plot is also moved by the inline offset determined at step 904. After step 910, when a variation of the cross-line offset CO is calculated, the vessel is instructed to modify its track with the variation δ relative to the old CO from the preplot or with the new CO relative to the source arrays' pre-plot or relative to the source array pre-plot translated by the inline offset determined at step 904. Then, in step 912, command instructions are generated by a controller (global or local) for steering the vessel with the new CO relative to the source arrays' pre-plot, starting at current time t. The process then returns in step 914 to step 906 for repeating steps 908-912 to continue to adjust the vessel's track so that the steered point follows the pre-plot as close as possible. From time to time, the process may return to step 902.

According to another embodiment, the process can update both the inline and the cross-line component of the offset to steer the vessel. An example of a method to implement this process is described in FIG. 9B. In step 920, a steered point P and its pre-plot track are selected. In step 922, a time delay Δt is computed based on the layback of the steered point P relative to the vessel and the speed of the spread. In step 924, the position vp(t) of the steered point P is determined at time t and the vessel's position is determined at a past time t-Δt. In step 926, the offset vector between vp(t) and the vessel's position at the past time is determined where the offset vector is determined at time t. The offset vector may be smoothed over time at step 928 and then used in step 930 to compute the vessel's track relative to the steered point P's pre-plot track by translating the steered point P's pre-plot track with the offset vector. In step 932, these results may be fed to the navigation system to steer the vessel accordingly.

Figure 10:
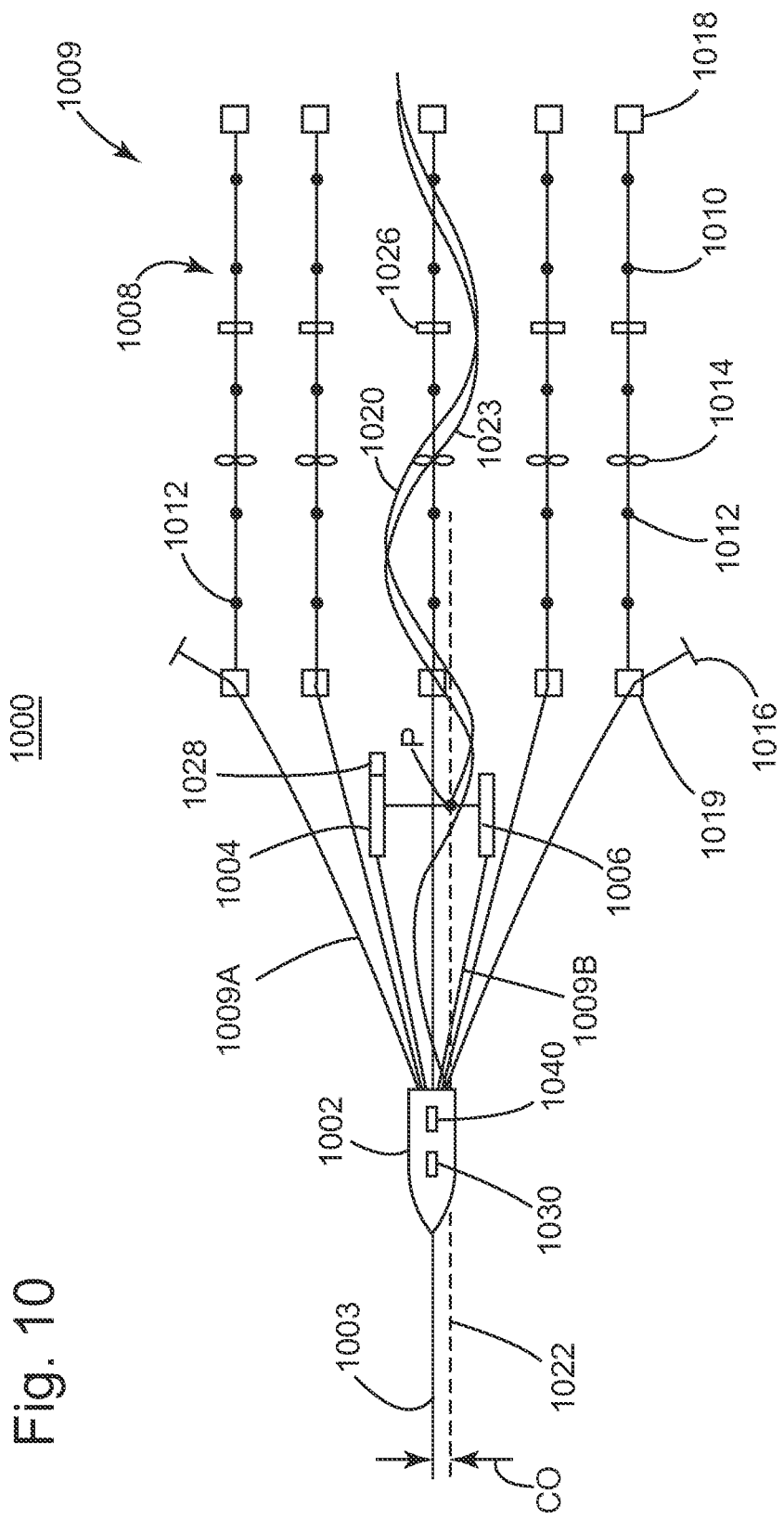
FIG. 10 is a schematic diagram of a seismic survey system that implements one of the methods noted above.

While the methods discussed above with regard to FIGS. 8, 9A and 9B schematically illustrate some concepts behind the process of steering the vessel for maintaining the steered point as close as possible to the pre-plot track, note that many other details may be considered during these calculations. For example, a seismic acquisition system 1000 is illustrated in FIG. 10 and includes a vessel 1002 that tows two source arrays 1004 and 1006 and a plurality of streamers 1008. Vessel 1002 follows a track 1003 during the seismic survey that is offset with a variable offset CO relative to source array's pre-plot track 1022. Each source array may include a float from which individual elements (e.g., air guns or marine vibrators) are suspended at a given depth in water. The individual elements may be distributed along a horizontal line, a slanted line, or a curved line (e.g., a multi-level source array). A distance between each source element and the float may be dynamically adjusted during the seismic survey. Each float may be provided with a global positioning system (GPS) 1028 for obtaining an accurate location of the source arrays.

One or more receivers 1010 are located on the plurality of streamers 1008, which may extend for miles behind the vessel. The streamer may be a fluid-filled streamer or a solid streamer, such as those manufactured by Sercel, France. The streamer includes various components, one of them being the seismic sensor or receiver 1010. The seismic sensor may be one of a hydrophone, a geophone, an accelerometer, a pressure gradient, a particle motion sensor, or any combination therein. The sensor may be a single-component or a multicomponent sensor. A single-component sensor is, for example, a hydrophone because it records only a single quantity (pressure) associated with the seismic data. A multicomponent sensor records a vector quantity (e.g., displacement, velocity, acceleration) associated with the seismic data. Combinations of these sensors may also be used, for example, having single- and multicomponent sensors collocated in the streamer, having single- or multicomponent sensors distributed in a transversal plane inside the streamer, etc. In one application, the streamer includes plural sections, with some sections including single-component seismic receiver and other sections including multicomponent seismic receivers. These sections may be alternately located along the streamer or only at certain locations.

For positioning the streamer, one or more control devices may be used. An example of such a control device is a bird 1014 that may be controlled to move laterally and/or vertically for adjusting a shape or position of the streamer. One or more paravanes may be provided at a head portion of the streamers and may be used to separate the streamers in the spread 1009 from each other so they do not tangle. Note that spread 1009 may include not only streamers 1008 and associated equipment (e.g., receivers, buoys, floats, birds, etc.) but also seismic sources 1004 and 1006 and lead-ins 1009A and 10098 that connect the source arrays and the streamers to the vessel. Tail buoys 1018 and head floats 1019 may be attached to the streamers' ends for maintaining their depth. Also, the buoys and floats may have GPS devices that offer accurate locations for the streamers' ends. When used together with a ranging system 1026, which is schematically illustrated in FIG. 10, an accurate position of the entire streamer may be determined by direct measurements. Note that ranging system 1026 includes pingers and transmitters distributed along the streamers and configured to "talk" to each other to determine distances between adjacent streamers.

Vessel 1002 is provided with one or more control devices 1030 configured to communicate (receive data and send commands) with the elements discussed above with regard to FIG. 10. For example, control device 1030 may instruct birds 1014 to change a depth of the streamers, or may control when the source elements need to be shot, or may receive seismic data from the sensors 1010 and 1012. While FIG. 10 shows a schematic control device 1030, those skilled in the art would recognize that control device 1030 may include many software and hardware components. For example, the control device may include a seismic module, a steering module, an automatic pilot, an integrated navigation system (INS) such as those provided by Concept system Ltd. or Sercel, France etc. Control device 1030 may also receive information regarding environmental conditions, for example, current speed, wind speed, water temperature, salinity, etc.

Control device 1030 may also communicate with the vessel's propulsion system 1040 for steering the vessel with an offset relative to a pre-plot track of the steered point. The pre-plot track may be calculated in a land facility and then downloaded to the control device or it may be calculated directly within the control device. The control device may also include a module for calculating the inline and/or cross-line offsets discussed above with regard to FIGS. 9A and 9B, based on the various information gathered during seismic acquisition, e.g., GPS data, ranging data, environmental conditions, etc.

Control device 1030 may also include a module that allows the vessel's operator to input data and/or commands. For example, control device 1030 may store a cable model that describes the elements indicated in FIG. 10. In this way, a force or angle or displacement applied on or generated by any element of system 1000 may be calculated, modified or measured. This module may be helpful in selecting the steered point and monitoring its path during the seismic survey. Also, the module may determine (plot) the steered point P's path over the ground 1020 at any moment and can also receive the vessel's past path 1023 for storing. The steered point P's actual path over the ground 1020 may differ from its pre-plot track 1022. In this example, the steered point P is considered to be a point between source arrays 1004 and 1006. Other positions may be selected for the steered point. Because the vessel has followed the path over the ground 1023, the control device can translate one of the two paths over the ground 1023 or 1020 by the inline offset and then calculate the cross-line offset between them. Further, the control device may receive transfer function F from the operator or from its memory, and then it can calculate the cross-line offset's variation δ as discussed above with FIGS. 8, 9A and 9B or it can calculate a smooth offset vector. This variation may then be applied to modify the vessel's track to a new target track so that the steered point's path follows the stored pre-plot track. All the above-mentioned data may be used by this or other devices for determining the inline and/or cross-line offsets. The smooth offset vector may be applied to steered point P's pre-plot track to calculate the new vessel track. The transfer function may also use the derivative, for example, to predict an expected offset vector or cross-line offset. This is very useful in areas where the current changes slowly and regularly either with time or position.

Other types of data may be used by control device 1030 to determine the correct offset. For example, historic data associated with a given subsurface and acquired earlier in time from other seismic surveys may be used, for example, to identify the direction of the currents for each location of the streamer. In one application, various sensors (acoustic sensors) are installed on the vessel's hull for positioning the streamers or the sources. This data may also be used by the control device 1030. Another example in which additional data may be employed by control device 1030 to determine the offset is data acquired by fixed structures, e.g., a rig. Oceanographic data is another example of additional data that may be obtained from specialized providers. Oceanographic data may be useful when calculating the cable model for describing the interaction of the streamers, paravanes, seismic sources with the ocean and/or the vessel.

Figure 11:
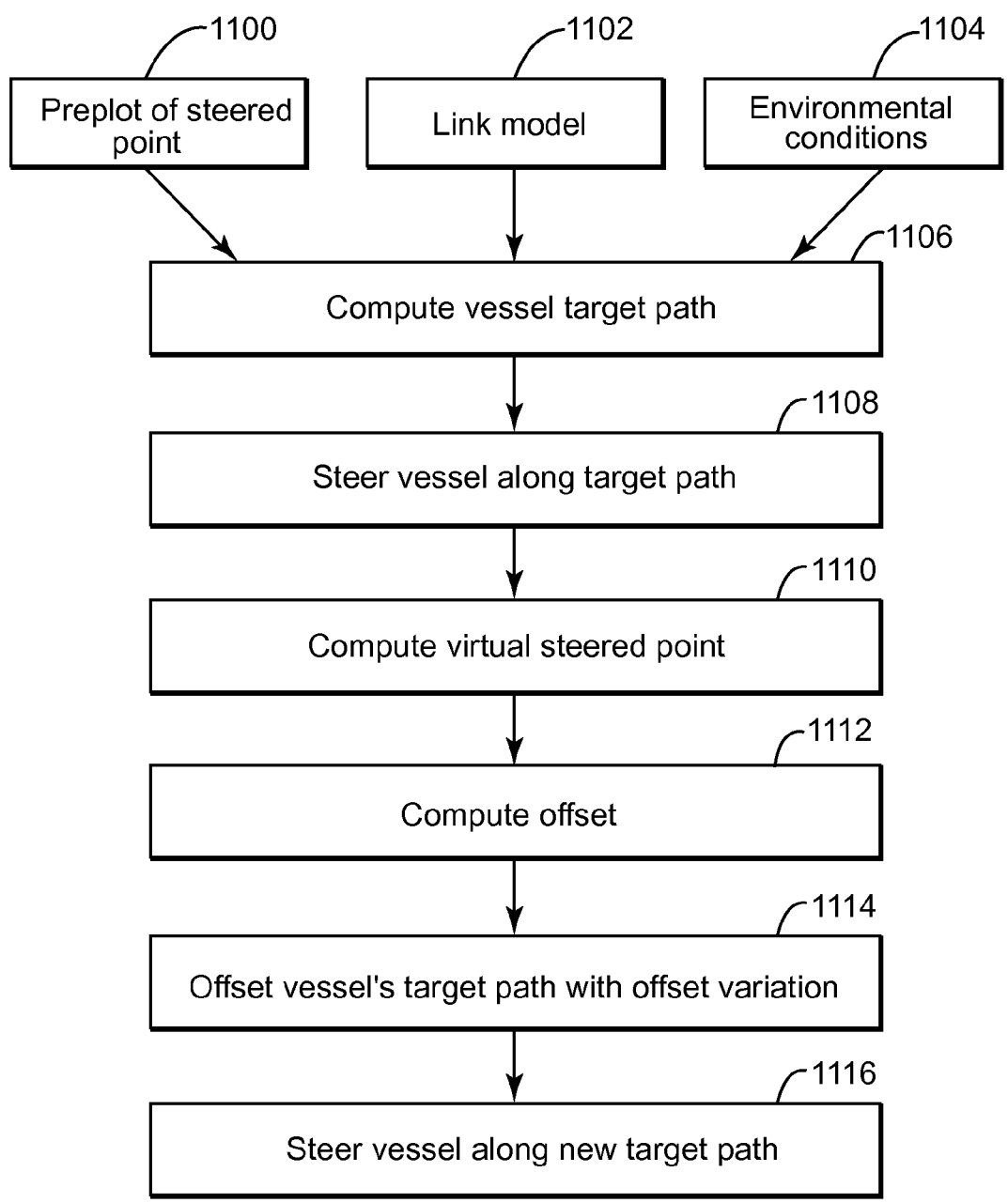
FIG. 11 is a flowchart of still another method for steering the vessel based on the offset variation between the vessel and the steered point.

Another method for steering the vessel so that a steered point (or point of interest) follows its pre-plot track is now discussed with regard to FIG. 11. In step 1100, a processor (e.g., control device 1030) reads or receives the pre-plot track of the steered point. In one application, this is the track that a middle point between source arrays 1004 and 1006 should follow during the seismic survey. In another application, the pre-plot track corresponds to a single source, or to a point located on a streamer, or to a virtual point associated with one or more streamers, source elements, towing lines, paravanes, birds, etc. The pre-plot track is traditionally calculated prior to starting the seismic survey.

In step 1102 the processor also receives the cable model and data associated with it. As noted above, the cable model describes the streamer spread and its interactions with the vessel and the ocean. Thus, the cable model takes into account many if not all the components towed by the vessel, interactions (e.g., forces, positions, angles) between the components, interactions between the components and the environment, interactions between the components and the vessel, etc. Environmental factors and/or conditions affecting the components and/or the vessel are received in step 1104. Environmental factors may include the features discussed above, but also additional data, e.g., historic data. Environmental factors may be passive (i.e., having values established a long time ago, e.g., a depth of the ocean bottom) or dynamic (i.e., having values updated on the go, e.g., wind speed).

Based on the information received in steps 1100, 1102, and 1104, the processor computes in step 1106 a target track for the vessel. This target track is offset by a given offset vector from the steered point's pre-plot track. The target track is loaded into the vessel's navigation system or autopilot and automatically maintained during the seismic survey as illustrated in step 1108. If the steered point is dynamically controlled, i.e., there is one or more elements (e.g., winch) on the seismic spread that controls the position of the steered point in addition to the vessel, then a virtual steered point is calculated (as discussed, for example, with regard to FIGS. 5A-B) in step 1110. An offset between the vessel's position at a past time and the virtual steered point's current position is calculated in step 1112, for example, as illustrated in the embodiments associated with FIGS. 8 and/or 9A and/or 9B. In step 1114, a variation of the offset between the vessel's past position (calculated or determined from the path over ground) and the virtual steered point's current position is calculated and applied to the vessel to determine a new target track, and the vessel is steered in step 1116 to follow the new target track until a new variation is calculated. As noted above, the target track may simply be the steered point's pre-plot track offset with a calculated cross-line offset or vector offset.

Note that the offset variation δ is applied to the vessel's track only if it is larger than a given threshold that depends on the survey's characteristics. In one example, the offset threshold is 1 m. This number is illustrative and not intended to limit the applicability of this method. The given threshold prevents oscillations that naturally occur while the vessel is manually steered or with traditional control loops which compare the position of the steered point with its pre-plot track. These oscillations are likely to occur in traditional navigation systems such as, for example, the one described in U.S. Pat. No. 8,391,102, unless complex control loops are added. The methods described above address this problem in a simple and efficient way, by not comparing the actual position of the steered point with its pre-plot position. In the above-described methods, it may happen that a small residual offset remains between the steered point's actual point and its pre-plot track, in which case it can be efficiently addressed by dynamical steering on the point to steer (typically source steering).

Note that the methods described herein do not compare the actual position of the steered point with its supposed position on the pre-plot track as others are doing in the art, as noted above. In more simple terms, according to an embodiment, the methods discussed above are adapted to compare the steered point's actual position at a current time t with an actual, past position of the vessel at a previous time t−Δt, calculate an offset between the two positions, calculate a variation of this offset in time, and this offset variation is then applied to correct the vessel's target track so the steered point follows its calculated pre-plot track. This procedure is then repeated continuously or not, depending on survey requirements. In one application, instead of applying the variation to the target track, the new target track is calculated as the offset of the steered point's pre-plot track with the calculated cross-line offset or vector offset.

In one application, the different computed values, including positions and offsets, can be filtered by different methods to remove measurement noise and/or high-frequency movements to obtain smooth and achievable tracks for the target vessel.

Figure 12:
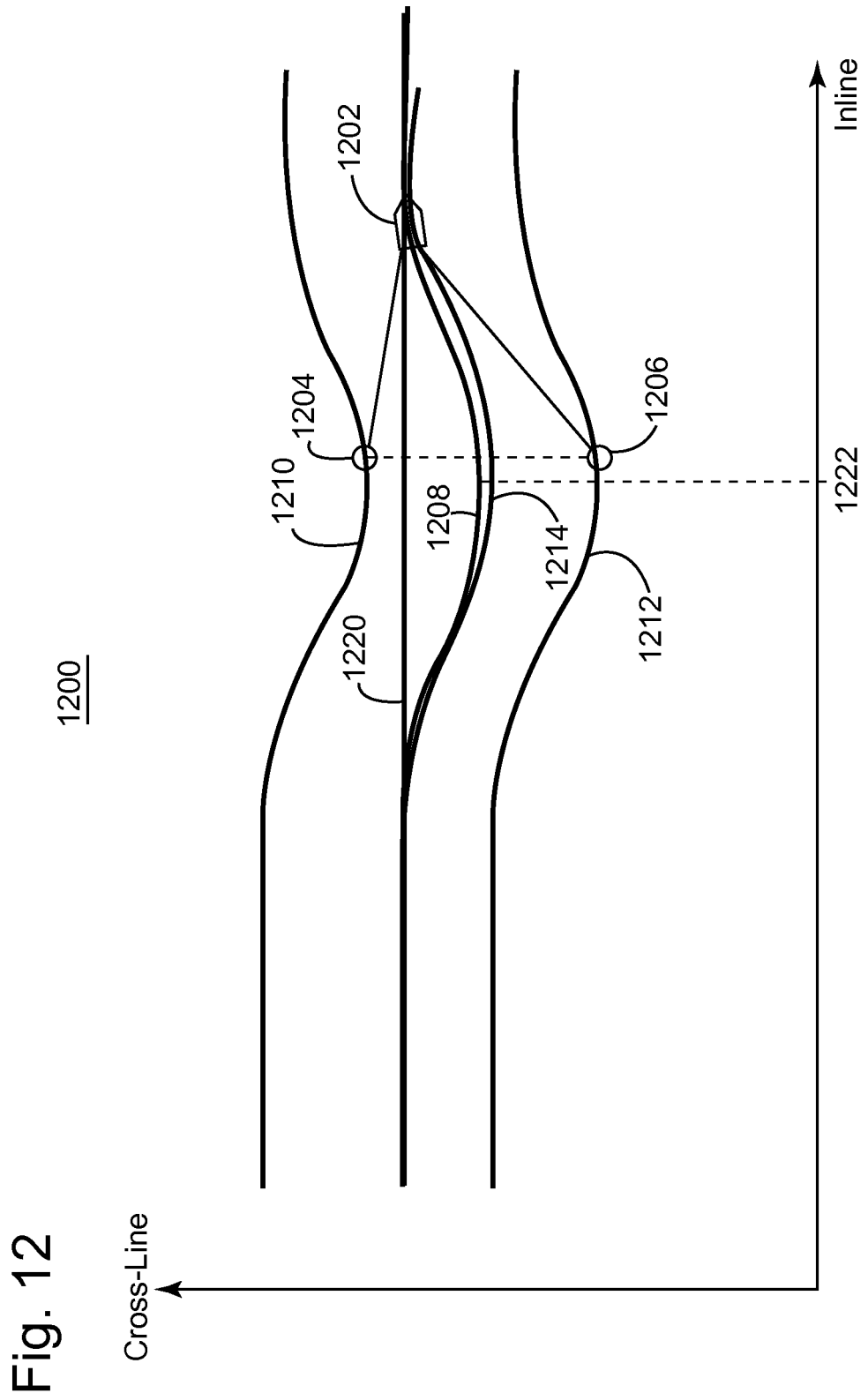
FIG. 12 illustrates matching deviations of the vessel's track and the steered point's track relative to each other.

In still another embodiment, a change in the vessel's direction during the seismic survey is taken into account when determining the offset variation to be applied to the vessel's target track. Changing the vessel's direction is a transitory effect and expected to happen infrequently during a traditional seismic survey. The seismic spread is following the vessel relative to the water. The ground track of the point to steer compared to vessel's track shows the inline effect of the current when there is small change in the vessel's direction as now discussed with regard to FIGS. 12 and 13. FIG. 12 illustrates a system 1200 having a vessel 1202 that tows first source 1204 and second source 1206. Vessel 1202's past path over the ground is 1208, first source 1204's path over the ground is 1210 and second source 1206's path over the ground is 1212. Pre-plot track 1214 describes a middle point between first and second sources 1204 and 1206. The paths and tracks extend along an inline direction and the deviations are observed along the cross-line direction. The scales of the inline and cross-line are different for illustrating the path deviations. Note that in this example the deviation of the vessel and the first and second sources from a reference line 1220 happens at the same line position 1222. This does not mean that the maximum deviation of the vessel or the sources from reference line 1220 happens at the same position 1222. FIG. 12 only illustrates a deviation from the reference line 1220.

Figure 13:
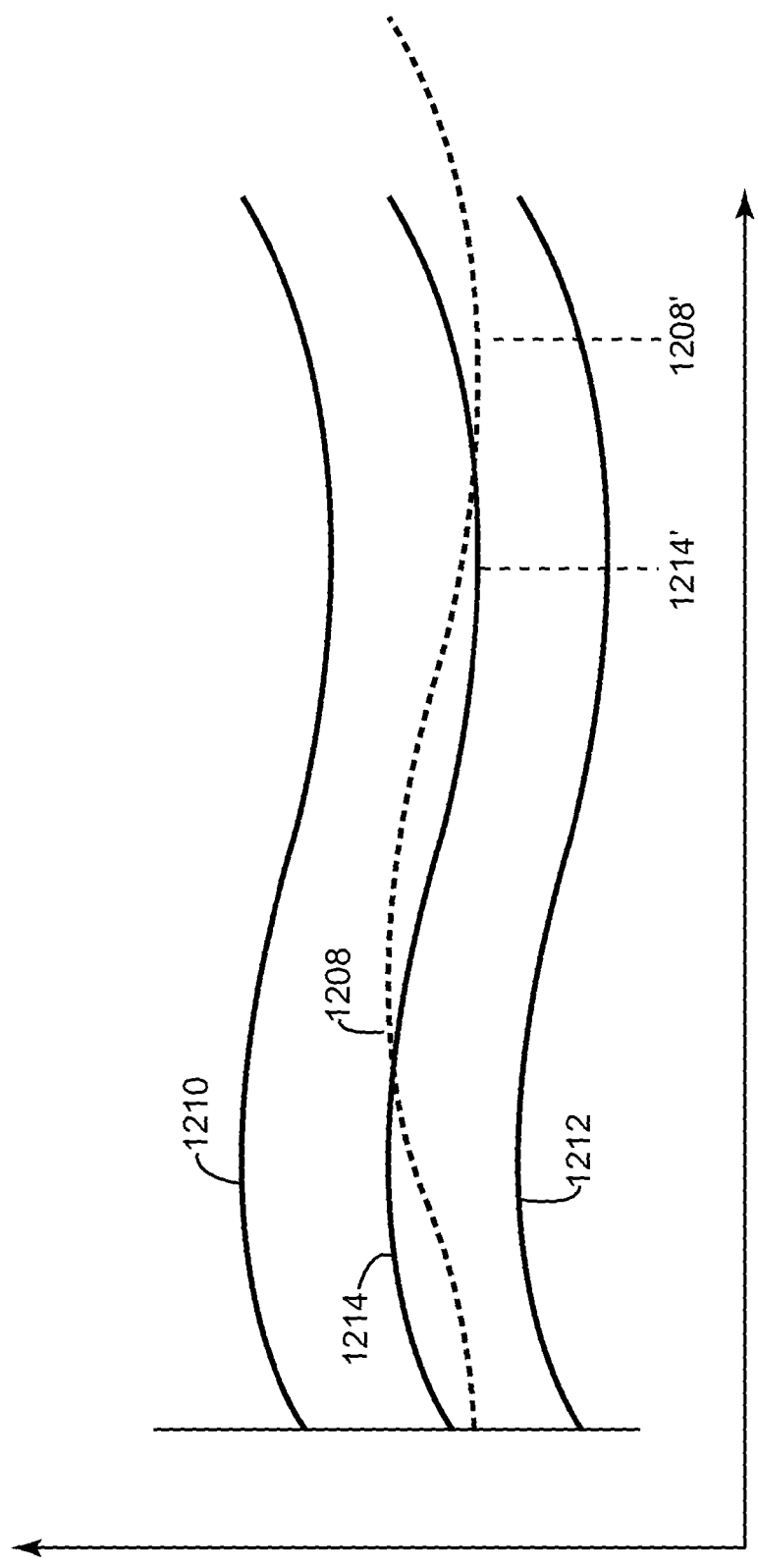
FIG. 13 illustrates unmatching deviations of the vessel's track and the steered point's track relative to each other.

However, as illustrated in FIG. 13, it is possible that the vessel deviates (maximum deviation) at a first inline position 1208' while the sources deviate (maximum deviation) at a second inline position 1214', and a distance between these two inline positions may be about 100 m for the specific arrangement of this figure. The inline difference between these two positions is the inline offset that, in one application, is applied to the vessel's path prior to calculating the cross-line offset.

Figure 14A:
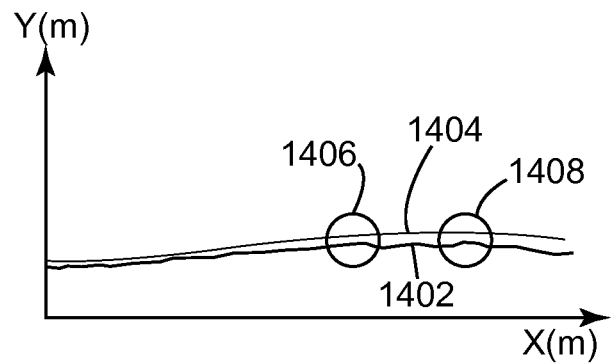
FIGS. 14A-C illustrate how a cross-line offset between the vessel and the steered track calculated with one of the above methods evolved along a line.

The above-discussed methods have been simulated for a real-life situation in which a vessel tows two source arrays, similar to the arrangement illustrated in FIG. 10. FIG. 14A illustrates the vessel's path over the ground 1402 and the source arrays' steered point path over the ground 1404 as a function of time. To better show the increasing cross-line distance (Y) between the two paths along the inline direction (X), the units on the cross-line axis are increased relative to those on the X axis, for example, with a ratio of 4:1. Note that cross-line distance increases from a given zone 1406 to a next zone 1408, and small vessel deviations are not reproduced by the steered point deviations. This increased offset between the vessel and the steered point happens because of environmental effects and will happen whether or not the point to steer follows the pre-plot track. That is one advantage of an embodiment, it measures an offset due to environmental effects and the steering does not change the offset. Thus, a system having this embodiment implemented is not a loop like those which compute a residual between an actual position and a planned position. Because of this different approach, the method is more reliable, it does not diverge, and it does not produce oscillations. Note that the traditional systems have the autopilot as a PID controller with a feedback loop so the loop itself can create oscillations. This is not the case for the method of this embodiment because no loop is necessary.

Figure 14B:
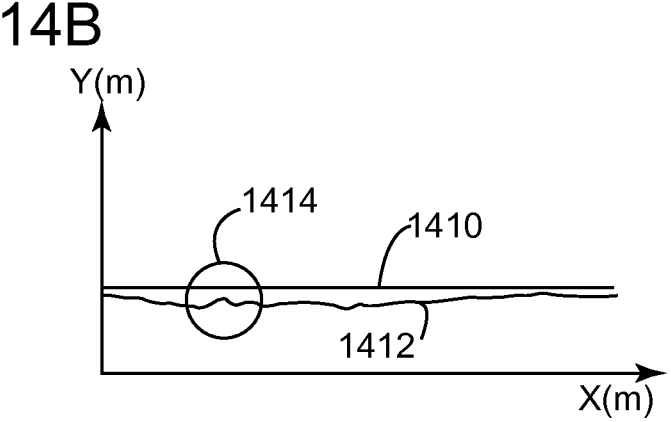
Figure 14C:
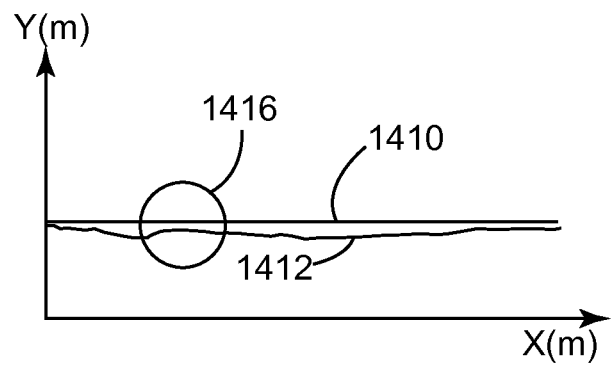

While FIG. 14A represents the paths over ground for the vessel and steered point, FIG. 14B represents the difference between the paths over ground. In this representation, one can see the cross-line deviation 1412 of the tracks relative to a reference line 1410. In FIG. 14C, an inline correction is applied before computing the difference between the two tracks. Note that cross-line deviation in zone 1416 in FIG. 14C is smoothed compared to corresponding zone 1414 in FIG. 14B when the inline offset is taken into account.

Figure 15:
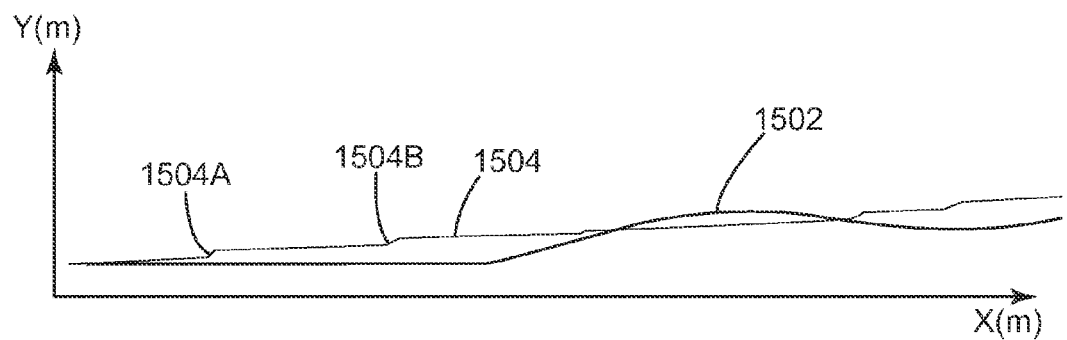
FIG. 15 is a track comparison for a vessel that is manually steered and steered according to one of the above methods.

FIG. 15 shows side by side an actual vessel's path over the ground 1502 during a seismic survey while the vessel is manually steered to track a given pre-plot track and the vessel's path over the ground 1504 if one of the steering methods discussed above is implemented. Note that the vessel's path over the ground 1504 that implements one of the above-discussed steering methods has one or more "jumps" 1504A, 1504B that correspond to the cross-line adjustments made based on the cross-line variation δ between the vessel's path over the ground and the steered point's path over the ground. In this example, the pre-plot track was a straight line.

Figure 16A:
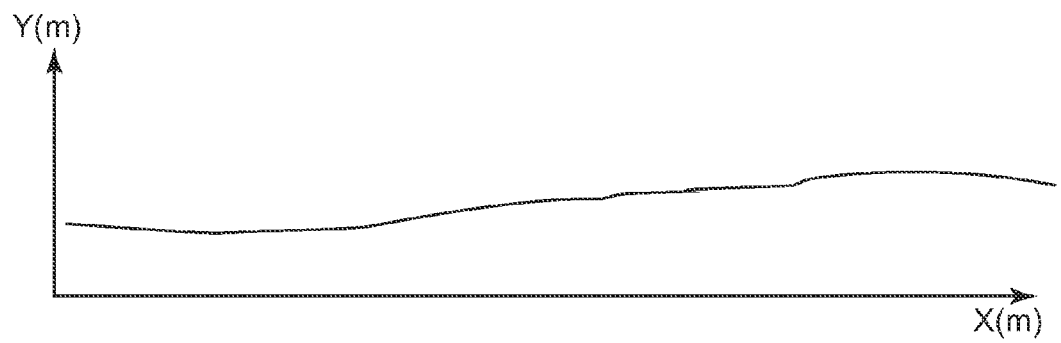
FIGS. 16A-B illustrate cross-line jumps in the vessel's trajectory due to one or more of the methods discussed herein.
Figure 16B:
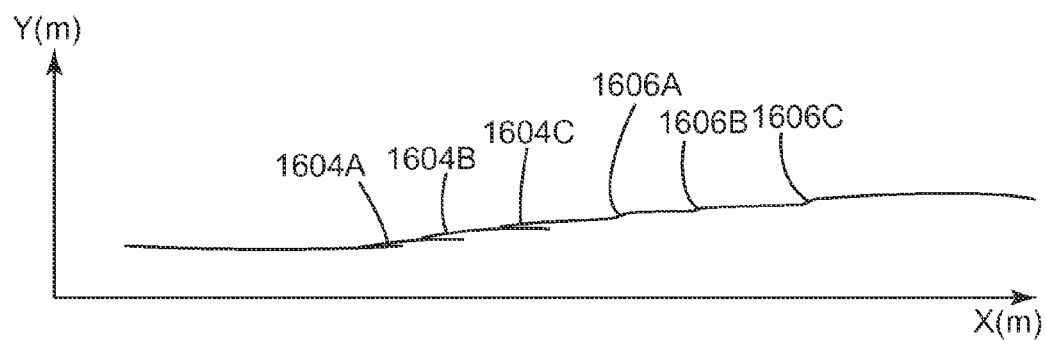

However, if the pre-plot track is not a straight line, still one or more of the above methods may be implemented, with a slight modification, so that the vessel is instructed to "jump" by a pre-determined distance, e.g., 1 m, when the pre-plot track changes. In this case, the path over the ground followed by the vessel will have some cross-line jumps due to the pre-plot track of the source array not being a straight line and other cross-line jumps due to the deviation δ of the cross-line distance between the steered point's current position and the vessel's past position. FIG. 16A shows the simulation of a vessel's path with 1 m jumps due to the cross-line's variation δ and FIG. 16B illustrate jumps 1604A-C due to the pre-plot track not being straight, and jumps 1606A-C due to the cross-line's variation δ.

Figure 17:
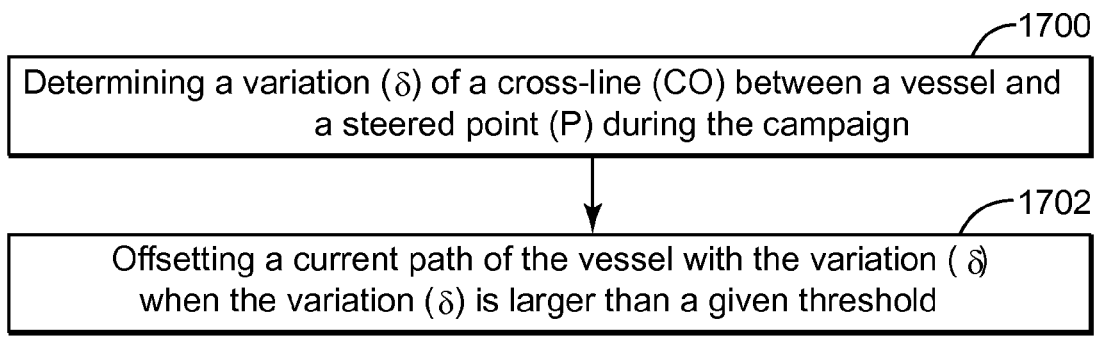
FIG. 17 is a flowchart of another method for driving a seismic vessel.

According to an embodiment illustrated in FIG. 17, there is a method for steering a vessel during a marine seismic acquisition survey. The method includes a step 1700 of determining a variation (δ) of a cross-line offset (CO) between a vessel and a steered point (P) during the survey, and a step 1702 of offsetting a track of the vessel with the variation (δ) when the variation (δ) is larger than a given threshold.

Figure 18:
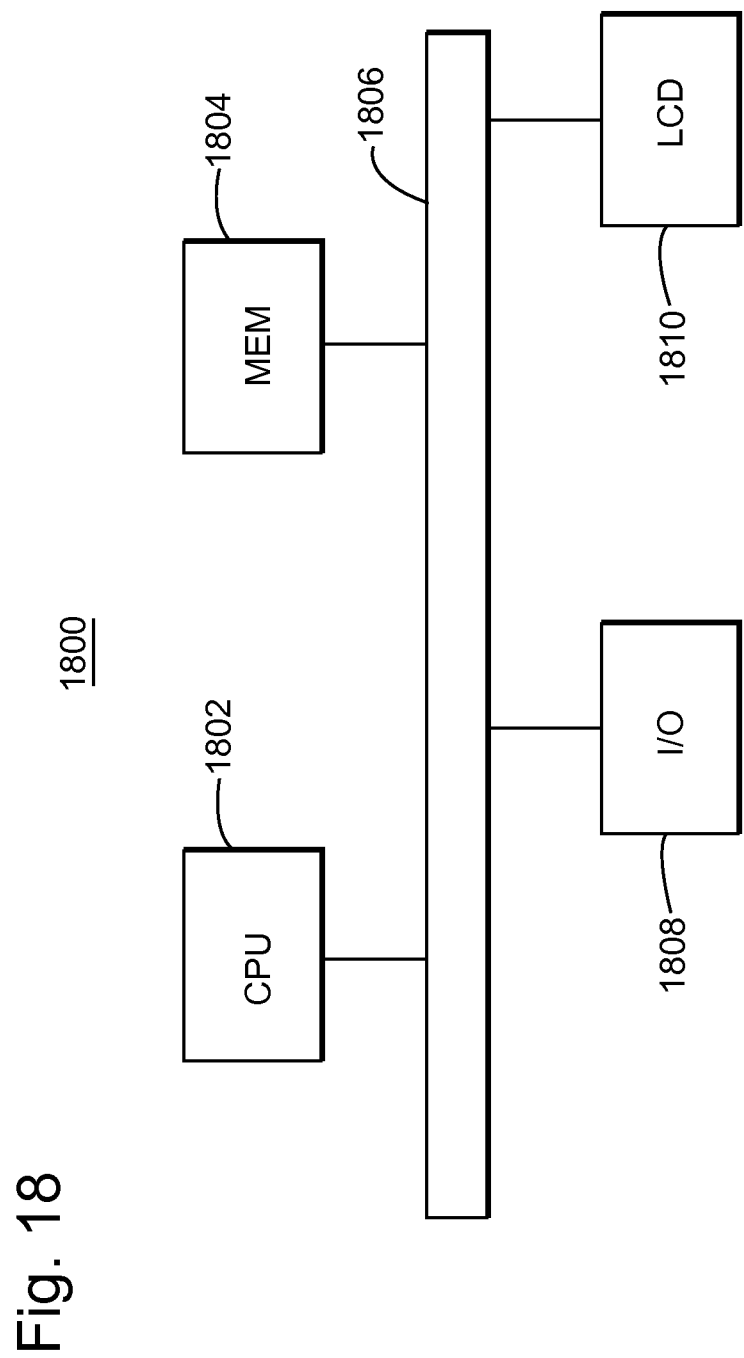
FIG. 18 is a schematic diagram of a controller for steering a seismic vessel.

With regard to the local and/or central controllers discussed above, a possible configuration of such a device is schematically illustrated in FIG. 18. Such a controller 1800 includes a processor 1802 and a storage device 1804 that communicate together via a bus 1806. An input/output interface 1808 also communicates with the bus 1806 and allows an operator to communicate with the processor or the memory, for example, to input software instructions for operating the actuator devices. The input/output interface 1808 may also be used by the controller to communicate with other controllers or interfaces provided on the vessel. For example, the input/output interface 1808 may communicate with a GPS system (not shown) for acquiring an actual position of the source array, or with an acoustical system for acquiring actual positions of the independent source elements of the source array. The controller 1800 may be computer or a server or a processor or dedicated circuitry. A screen 1810 may also be attached to the controller for aiding in the visualization of the steered point's and vessel's paths.

Figure 19:
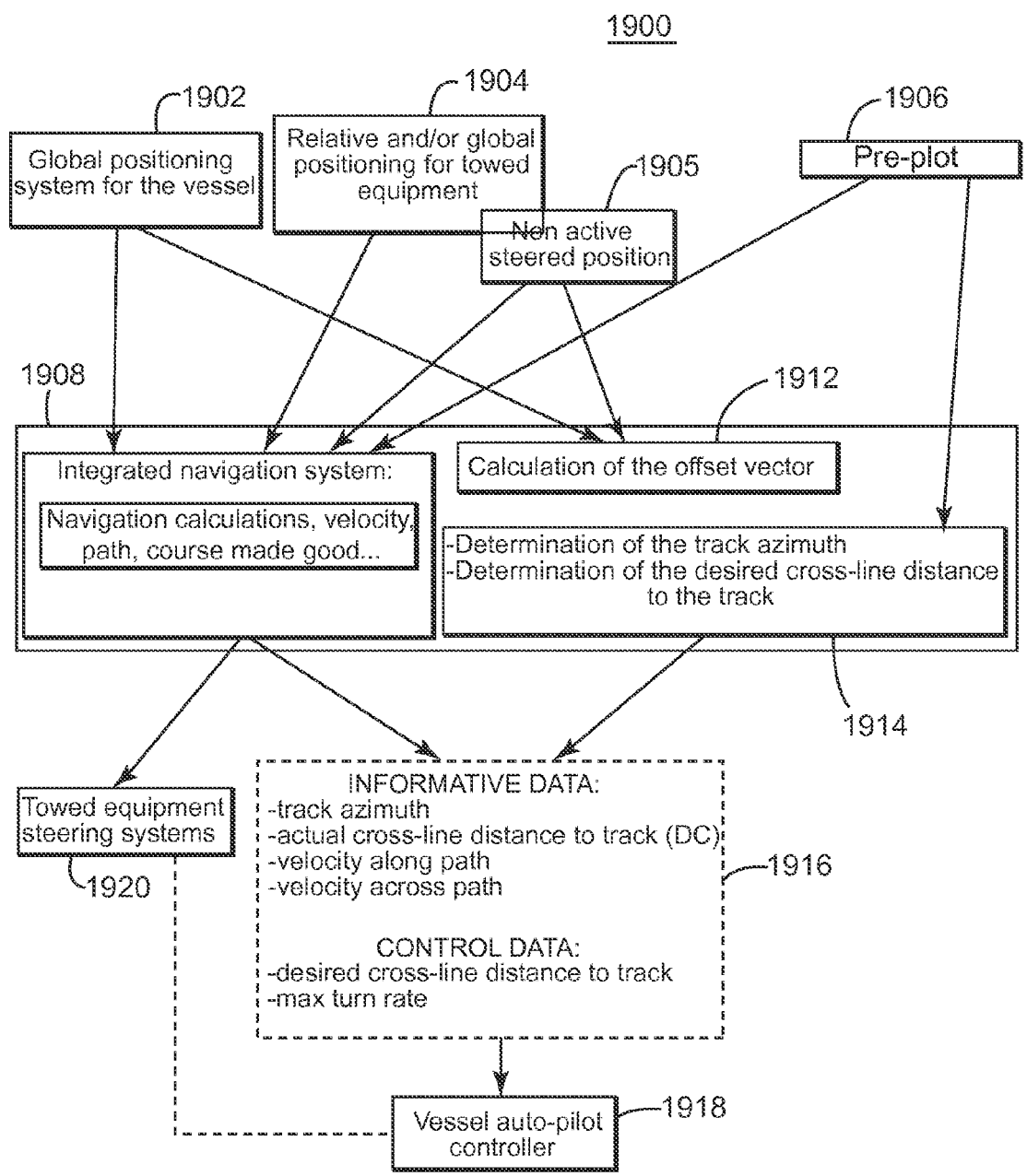
FIG. 19 is a schematic diagram of a seismic survey system that implements one of the above-noted methods.

FIG. 19 shows a schematic block representation of a seismic navigation system 1900 according to another embodiment. The vessel is positioned with an accurate global positioning system 1902 like the GPS or Galileo for example, which it is expected to provide positions with an accuracy better than a couple of meters. The towed equipment is positioned with a global positioning system or relative or a mixed system 1904, like a USBL (ultra-short base line) coupled to a GPS and it is expected to provide a relative position with an accuracy better than a couple of meters. A non-active steering module 1905 may provide information regarding a towed point, e.g., the source, when no active steering is employed for the towed point. Such module may include a memory that stores past positions of the towed point. A pre-plot track has been provided or calculated from previous data by a pre-plot unit 1906.

The INS (integrated navigation system) 1908 receives all the navigation measurements, and in some case it may include module 1904 that computes the relative positioning of the towed equipment. In one application, the INS could even include module 1902 computing the vessel position. Module 1912 may receive the vessel's position relative to the Earth, from module 1902, and the relative (or global relative to the Earth) position of the towed equipment, from module 1904, and computes the offset vector based on one of the methods discussed above. Using the pre-plot track, module 1914 further determines the track azimuth which is used to determine the cross-line component of the offset, thus determines the cross-line distance to the track.

The INS is sending information data 1916 to the autopilot 1918 about the actual cross-line distance of the vessel to the track, about velocity along the path and across the path. It also sends the maximum turn rate. Module 1914 is providing the track azimuth and the desired cross-line distance to the track to the autopilot 1918. Module 1914 can be included in the INS or not. The autopilot controller 1918 controls the vessel's steering and/or speed so as to follow the track at the desired cross-line distance. In case of towed equipment steering, INS module 1908 receives the position that the towed equipment would have if it was not steered. In case of active steering, the INS may provide information or commands to the towed equipment steering system 1920. Note that, as long as there is no vessel speed change by the auto-pilot, there is no real time feedback loop from the vessel auto-pilot to modules 1912 and 1914 because those modules are changing their requests to the auto-pilot based on past position of the vessel. In a way, whether or not the auto-pilot reaches the required cross-line distance does not change the value of the calculated offset vector, which depends only on the environmental conditions, the vessel's speed, and the geometry of the towed equipment (inline distance). This is one of the advantages of this system.

A method for steering a vessel during a marine acquisition campaign is now discussed with reference to FIG. 20. Note that this method is based on one or more of the embodiments previously discussed. The method includes a step 2000 of obtaining a pre-plot track of a steered point, wherein the steered point is associated with an equipment spread towed by the vessel, a step 2002 of calculating an offset between a past position of the vessel and a current position of the steered point, and a step 2004 of steering the vessel along a vessel track, wherein the vessel track is calculated by shifting the pre-plot track of the steered point with at least a cross-line component of the offset.

The above embodiments have been discussed without specifying what type of source, streamer, acquisition configuration and/or acquisition scheme were used. Those skilled in the art would appreciate that any types of these elements may be used with the above-noted embodiments. For example, in an effort to list some of these types, but without exhausting all of them, note that a source may include one or more source arrays or source elements. A source array may include any number of sub-arrays, typically three. A sub-array includes plural source elements, typically between five and eight. A sub-array may include a float configured to float in water and from which the source elements are attached. A source element may be impulsive, e.g., an air gun that simultaneously generates all the frequencies in a given frequency range, or vibratory, e.g., a vibrating element that generates during a sweep time the frequencies in the given frequency range. The source elements may be located at a same water depth or at different water depths to form a multi-level source. In one application, more than one vessel may be used to tow the sources. The vessels may progress along the seismic pre-plots with the same inline position, or with inline positions staggered based on a pre-determined scheme, or with the inline positions distributed along a straight line. The source elements and/or the source arrays and/or the source sub-arrays may be actuated simultaneously, simultaneously but with some time delays (random, pseudo-random, or pre-calculated), in a flip-flop manner or according to any other known scheme.

In one embodiment, a source array may be steerable and configured to include at least an actuation device, mounted on the source array, which is capable of actuating a link to a lead-in to change a position of the source array in a plane substantially parallel with the water's surface. The actuation device may be provided to modify the position of the entire source array or only a part of the source array, e.g., a sub-array or an individual source element. The actuation device may be an electrically-driven winch. The actuation device may be configured to be driven by a control mechanism located on a towing vessel, a control mechanism provided on the source array, a combination of them, or manually driven. The actuation device link is configured to connect to a lead-in configured to attach to a head of a streamer. The connection to the lead-in may be fixed or movable, e.g., via a slider.

The above-discussed embodiments may be applied to a single or a plurality of source vessels. A distance between the source and the vessel may have any value, for example less than 100 m. A typical distance between the vessel and the source is in the range of 400 to 800 m. If the distance is less than 100 m, it would be expected that the source follows the pre-plot track with such accuracy that a source steering system would not be needed. Although the above embodiments have been discussed in the context of a seismic survey, the methods of these embodiments are also applicable to other towed equipment, even if it is not seismic, for example mine hunting, obstruction determination, hazard to navigation detection, etc.

One or more of the embodiments discussed above provide a steering scheme for a vessel that makes a steered point to closely follow a pre-determined track. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method for steering a vessel during a marine acquisition campaign, the method comprising:
    obtaining a pre-plot track of a steered point, wherein the steered point is associated with an equipment spread towed by the vessel;
    calculating an offset between a past position of the vessel and a current position of the steered point; and
    steering the vessel along a vessel track, wherein the vessel track is calculated by shifting the pre-plot track of the steered point with at least a cross-line component of the offset,
    wherein the current position of the steered point corresponds to a current time while the past position of the vessel corresponds to a time earlier than the current time.

2. The method of claim 1, wherein the equipment spread is a seismic spread.

3. The method of claim 1, wherein the steered point is located mid-point between two seismic source arrays.

4. The method of claim 3, wherein the pre-plot track of the steered point is a mean course of two pre-plot tracks of the two seismic source arrays towed by the vessel.

5. The method of claim 3, wherein the pre-plot track of the steered point is a filtered mean course of the two pre-plot tracks of the two source arrays.

6. The method of claim 1, wherein the steered point is an abstract point logically linked to the equipment spread.

7. The method of claim 1, wherein the vessel track is further shifted with an inline component of the offset relative to the pre-plot track of the steered point.

8. The method of claim 1, wherein a new vessel track is recomputed when a variation of the offset is greater than a given threshold.

9. The method of claim 1, further comprising:
    determining a time interval $\Delta t$ based at least on a speed of the vessel and an inline distance travelled by the steered point; and
    determining the offset as a difference between the current position of the steered point at current time t and a past position of the vessel at a past time $t-\Delta t$.

10. The method of claim 2, wherein the steered point is a virtual point corresponding to a given point in the seismic spread, the virtual point being the point where the given point would be if there had been no steering of a part of the seismic spread that includes the given point.

11. A method for steering a vessel during a marine seismic acquisition campaign, the method comprising:
    determining a variation ($\delta$) of a cross-line component (CO) of an offset between a past position of a vessel and a current position of a steered point (P) associated with a marine seismic spread towed by the vessel during the campaign; and
    steering the vessel by offsetting a current track of the vessel with the variation ($\delta$) when the variation ($\delta$) is larger than a given threshold, wherein the current position of the steered point corresponds to a current time while the past position of the vessel corresponds to a time earlier than the current time.

12. The method of claim 11, wherein the steered point (P) is one of a center of the source array, a midpoint between source arrays, a center of a front end of streamers and a midpoint between the source arrays and a center of the front end of the streamers.

13. The method of claim 11, further comprising:
calculating an inline offset (IO) between a path over ground of the steered point (P) and a path over ground of the vessel.

14. The method of claim 13, further comprising:
determining the offset to be a vector having a first component the cross-line offset and the second component the inline offset.

15. The method of claim 11, wherein the vessel advances along an inline direction and the cross-line offset is calculated along a cross-line direction, which is substantially perpendicular on the inline direction and within a plane substantially parallel to the water surface.

16. The method of claim 11, further comprising:
generating in a control device commands for steering the vessel along the vessel track that is offset by the variation ($\delta$) relative to the current track.

17. The method of claim 11, further comprising:
determining an inline offset (IO) along the inline direction, between the past position of the vessel and the current position of the steered point (P); and
offsetting the current path of the vessel with the inline offset (IO) prior to determining the cross-line offset (CO) between the vessel and the steered point (P) during the campaign.

18. The method of claim 11, further comprising:
receiving a pre-plot track of the steered point (P), where the pre-plot track includes a change in direction; and
further offsetting the current track of the vessel based on the change in direction.

19. The method of claim 11, further comprising:
receiving a pre-plot track associated with the steered point (P);
storing in a control device a cable model that describes an interaction between the vessel and the marine spread associated with the steered point;
receiving environmental conditions; and
computing a new track of the vessel based on the offset, the pre-plot track of the steered point, the cable model and the environmental conditions.

20. A navigation system configured to steer a vessel and associated seismic equipment, the system comprising:
a global positioning system configured to generate a first position for the vessel and a second position for the associated seismic equipment; and
a navigation module that obtains a pre-plot track of a steered point, wherein the steered point is associated with the associated seismic equipment towed by the vessel, calculates an offset between a past position of the vessel and a current position of the steered point, and steers the vessel along a vessel track, wherein the vessel track is calculated by shifting the pre-plot track of the steered point with at least a cross-line component of the offset,
wherein the current position of the steered point corresponds to a current time while the past position of the vessel corresponds to a time earlier than the current time.

* * * * *